(12) United States Patent
Kimura

(10) Patent No.: US 8,331,034 B2
(45) Date of Patent: Dec. 11, 2012

(54) ZOOM LENS SYSTEM AND IMAGE PICKUP APPARATUS INCLUDING THE SAME

(75) Inventor: Tomonori Kimura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 154 days.

(21) Appl. No.: 12/898,790

(22) Filed: Oct. 6, 2010

(65) Prior Publication Data

US 2011/0080653 A1 Apr. 7, 2011

(30) Foreign Application Priority Data

Oct. 6, 2009 (JP) ................................. 2009-232227

(51) Int. Cl.
*G02B 15/14* (2006.01)
(52) U.S. Cl. .......................... 359/685; 359/676; 359/683
(58) Field of Classification Search .................... 359/685
See application file for complete search history.

(56) References Cited

U.S. PATENT DOCUMENTS

| 6,373,639 | B2 | 4/2002 | Hayakawa et al. |
| 7,177,092 | B2 | 2/2007 | Satori et al. |
| 7,830,612 | B2 * | 11/2010 | Hagiwara ...................... 359/676 |
| 7,864,442 | B2 * | 1/2011 | Yamashita .................... 359/683 |
| 8,107,171 | B2 * | 1/2012 | Nanba ........................... 359/683 |
| 2008/0144188 | A1 * | 6/2008 | Hamano ........................ 359/683 |
| 2009/0116120 | A1 * | 5/2009 | Saruwatari .................... 359/686 |

OTHER PUBLICATIONS

"Ohara Inc. : S-FPL." Ohara. Web. Apr. 24, 2012. <http://www.ohara-inc.co.jp/en/product/optical/list/s-fpl.html>.*

* cited by examiner

*Primary Examiner* — Ricky Mack
*Assistant Examiner* — Zachary Wilkes
(74) *Attorney, Agent, or Firm* — Rossi, Kimms & McDowell LLP

(57) ABSTRACT

A zoom lens system comprises, from an object side to an image side: a first lens unit; a second lens unit; a third lens unit; a fourth lens unit; and a fifth lens unit having positive refractive power, wherein: in zooming from a wide angle end to a telephoto end, the first, the second, the third, and the fourth lens units move so that an interval between the first and the second lens units is larger at the telephoto end than that at the wide angle end, an interval between the second and the third lens units is smaller at the telephoto end than that at the wide angle end, and a distance between the third and the fourth lens units varies; and a focal length of the first lens unit, and focal lengths of an entire system at the wide angle end and the telephoto end are appropriately set.

19 Claims, 22 Drawing Sheets

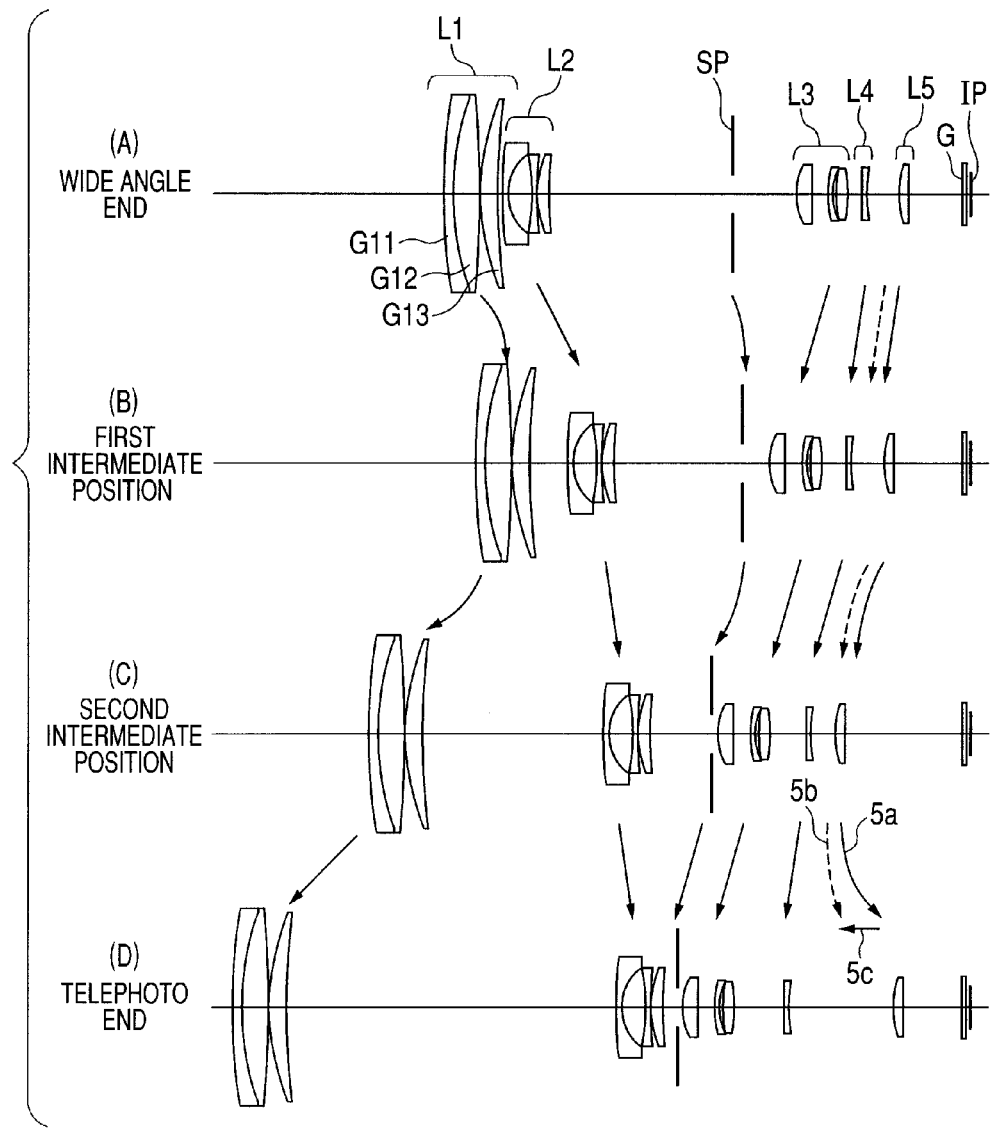

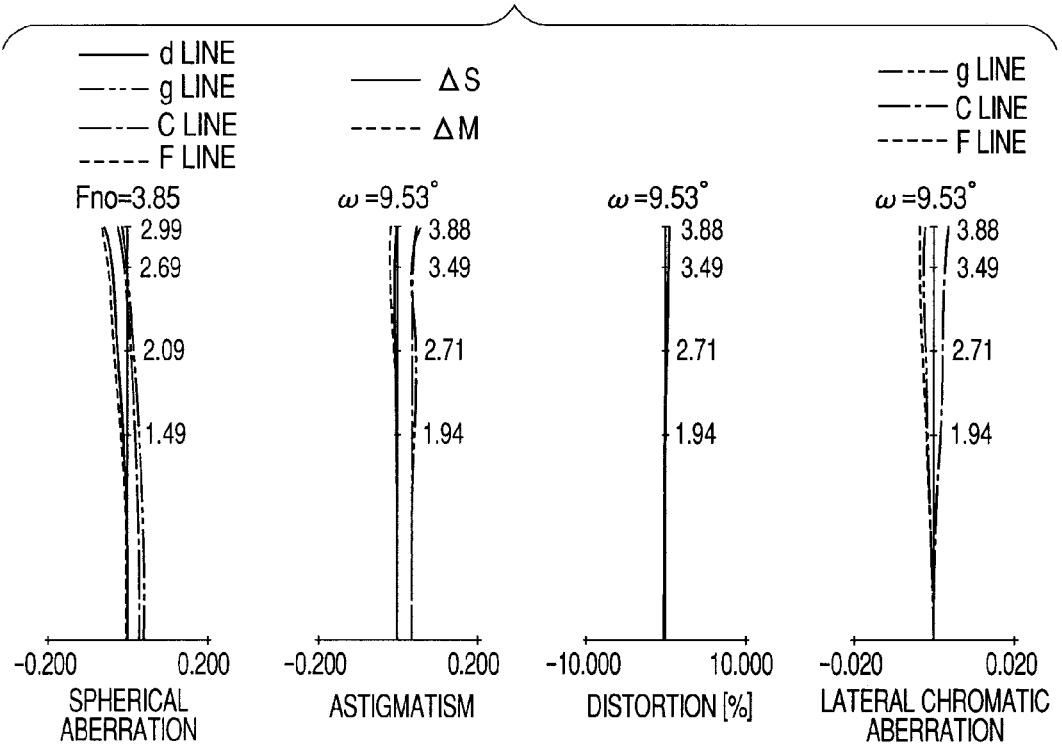
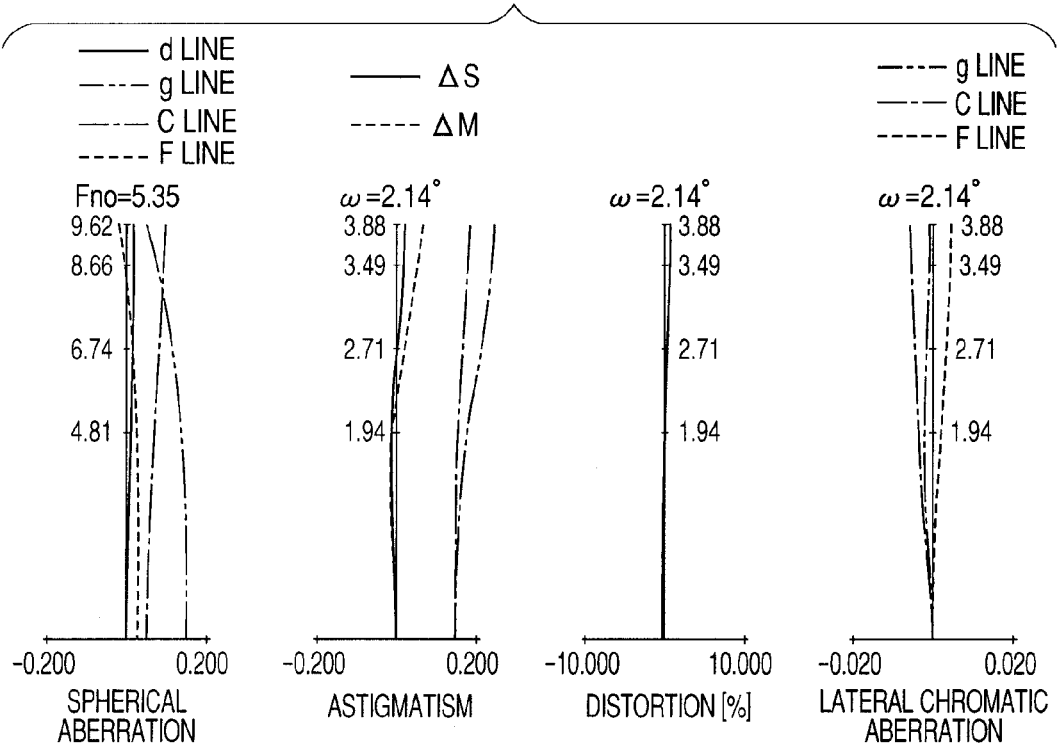

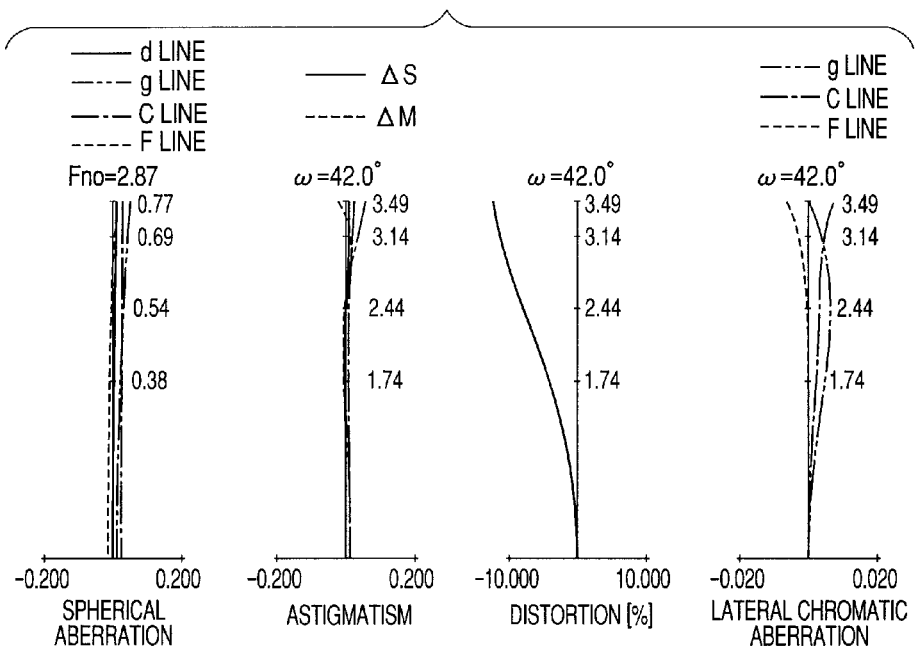
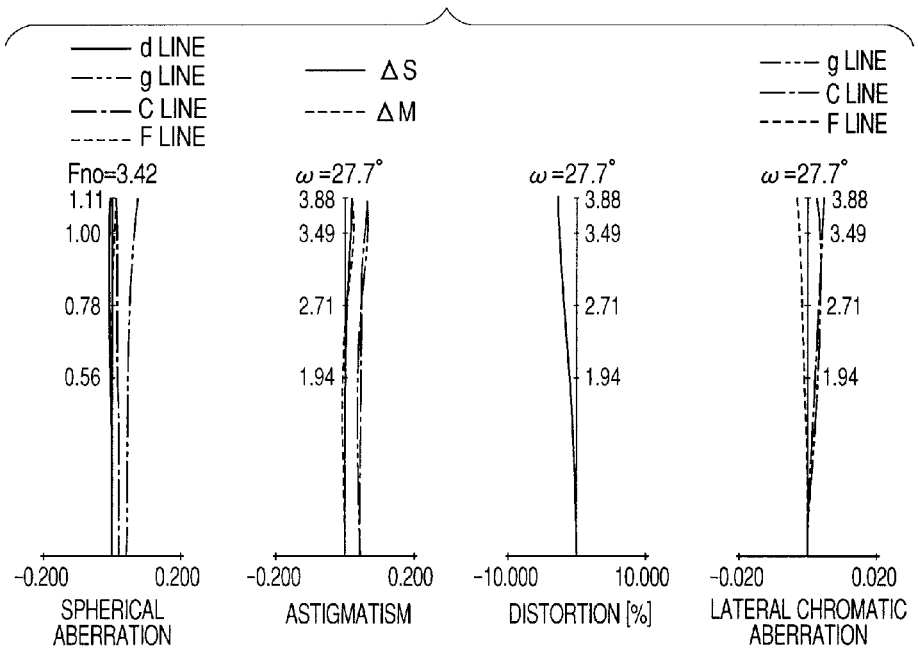

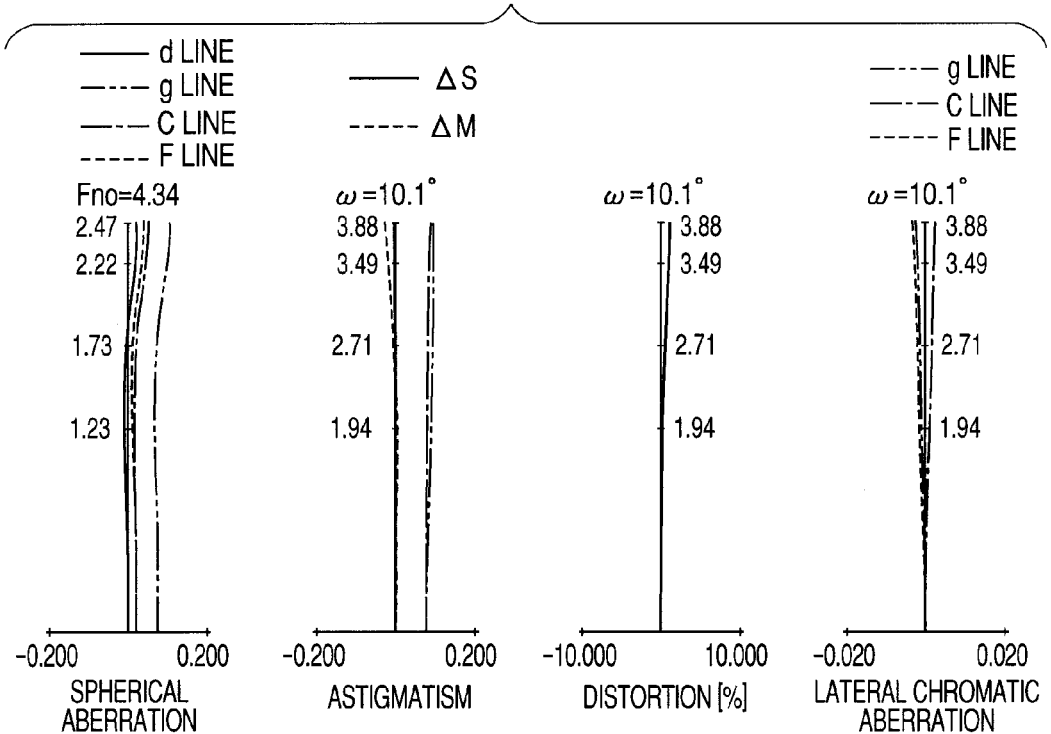
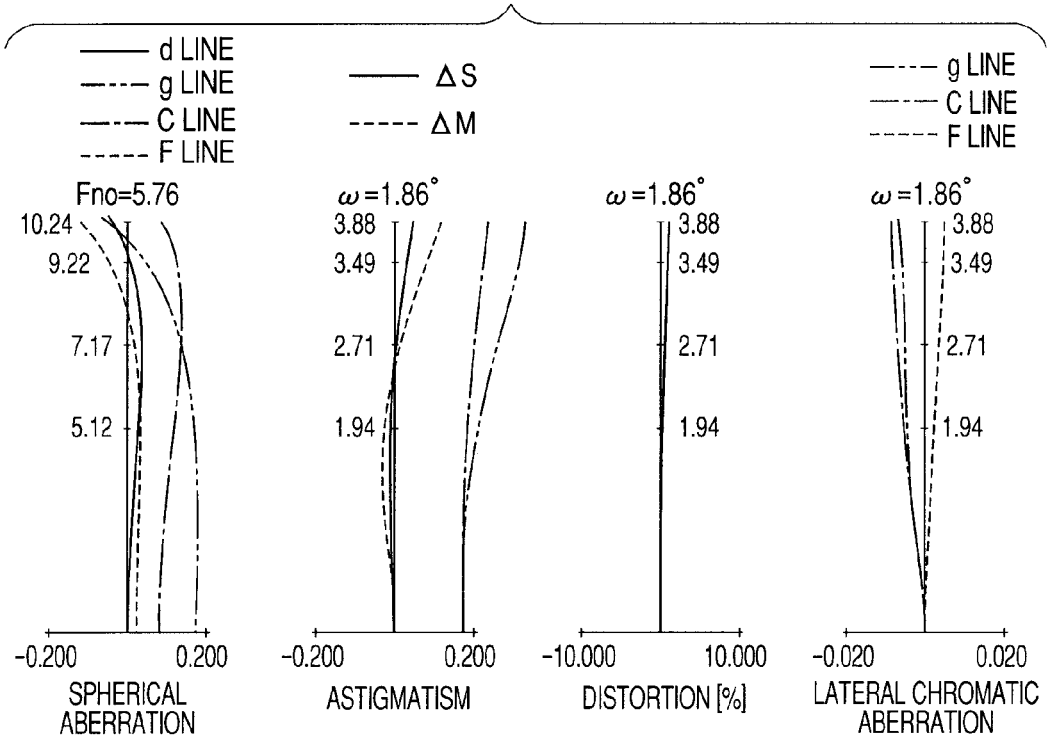

ZOOM LENS SYSTEM AND IMAGE PICKUP APPARATUS INCLUDING THE SAME

BACKGROUND OF THE INVENTION

1. Field of the Invention

The present invention relates to a zoom lens system and an image pickup apparatus including the zoom lens system, which are suitable, in particular, for an image pickup apparatus using a solid-state image pickup element, such as a video camera, an electronic still camera, a broadcasting camera or a monitor camera, or an image pickup apparatus such as a silver-halide film camera.

2. Description of the Related Art

In recent years, an image pickup apparatus using a solid-state image pickup element, such as a video camera, a digital still camera, a broadcasting camera, or a monitor camera, as well as a silver-halide film camera has high performance, and the entire apparatus is downsized. Then, a photographing optical system used for the image pickup apparatus is required to be a high-resolution zoom lens system having a short total lens length, a compact size, and a high zoom ratio. As one of the zoom lens systems which meet the requirements, there is known a so-called rear focus type zoom lens system, which performs focusing by moving lens units other than a first lens unit on the object side.

In general, a rear focus type zoom lens system has a smaller effective diameter of the first lens unit than other type of zoom lens system that performs focusing by moving the first lens unit, so as to realize a small size of the entire lens system easily. In addition, macro photography can be performed easily. Further, because a small and light lens unit is moved, small drive force of the lens unit is sufficient so that a quick focusing can be realized. As the rear focus type zoom lens system, there is known a zoom lens system including, in order from the object side to the image side, a first lens unit having positive refractive power, a second lens unit having negative refractive power, a third lens unit having positive refractive power, and subsequent one or more lens units. Among them, there is known a five-unit zoom lens system including five lens units which have, in order from the object side to the image side, positive, negative, positive, negative, and positive refractive powers (U.S. Pat. No. 7,177,092). In addition, there is known a six-unit zoom lens system including six lens units having positive, negative, positive, negative, positive, and negative refractive powers in order from the object side to the image side (U.S. Pat. No. 6,373,639).

In general, in order to obtain a zoom lens system having a downsized entire system while having a predetermined zoom ratio, refractive power (optical power, or inverse number of a focal length) of each lens unit constituting the zoom lens system needs to be enhanced to reduce the number of lenses. However, such a zoom lens system has much aberration variation accompanying zooming, and it is difficult to obtain high optical performance over the entire zoom range. In particular, it is difficult to correct various aberrations such as chromatic aberration at a telephoto end. In order to obtain a high zoom ratio and downsize the entire lens system while obtaining good optical performance in the five-unit zoom lens system or the six-unit zoom lens system described above, it is important to appropriately set refractive power and lens configuration of each lens unit and a move condition of each lens unit in zooming. In particular, it is important to appropriately set refractive power of the first lens unit and move conditions of the first, third, and fourth lens units in zooming. Unless those structures are set appropriately, it is difficult to obtain a zoom lens system having a small entire system, a wide angle of field, a high zoom ratio, and high optical performance.

SUMMARY OF THE INVENTION

It is an object of the present invention to provide a zoom lens system having a small entire optical system, a wide angle of field, a high zoom ratio, and high optical performance over an entire zoom range, and to provide an image pickup apparatus including the zoom lens system.

A zoom lens system according to the present invention includes, in an order from an object side to an image side: a first lens unit having positive refractive power; a second lens unit having negative refractive power; a third lens unit having positive refractive power; a fourth lens unit having negative refractive power; and a fifth lens unit having positive refractive power, in which: in zooming from a wide angle end to a telephoto end, the first lens unit, the second lens unit, the third lens unit, and the fourth lens unit move so that an interval between the first lens unit and the second lens unit is larger at the telephoto end than that at the wide angle end, an interval distance between the second lens unit and the third lens unit is smaller at the telephoto end than that at the wide angle end, and an interval between the third lens unit and the fourth lens unit varies; and the following conditional expressions are satisfied:

$$8.0 < f1/fw < 25.0;\ \text{and}$$

$$0.35 < f1/ft < 0.70,$$

where f1 denotes a focal length of the first lens unit, and fw and ft denote focal lengths of an entire system at the wide angle end and at the telephoto end, respectively.

Further features of the present invention will become apparent from the following description of exemplary embodiments with reference to the attached drawings.

BRIEF DESCRIPTION OF THE DRAWINGS

FIG. 1 illustrates lens cross sections at a wide angle end (A), at a first intermediate zoom position (B), at a second intermediate zoom position (C), and at a telephoto end (D), according to a first embodiment of the present invention.

FIG. 6C is an aberration diagram at the second intermediate zoom position according to the third embodiment of the present invention.

FIG. 6D is an aberration diagram at the telephoto end according to the third embodiment of the present invention.

FIG. 8A is an aberration diagram at the wide angle end according to the fourth embodiment of the present invention.

FIG. 8B is an aberration diagram at the first intermediate zoom position according to the fourth embodiment of the present invention.

FIG. 10C is an aberration diagram at the second intermediate zoom position according to the fifth embodiment of the present invention.

FIG. 10D is an aberration diagram at the telephoto end according to the fifth embodiment of the present invention.

DESCRIPTION OF THE EMBODIMENTS

Hereinafter, a zoom lens system according to the present invention and an image pickup apparatus including the zoom lens system are described. The zoom lens system according to the present invention includes at least five lens units, which are, in order from an object side to an image side, a first lens unit having positive refractive power, a second lens unit having negative refractive power, a third lens unit having positive refractive power, a fourth lens unit having negative refractive power, and a fifth lens unit having positive refractive power. In zooming, the first to fourth lens units are moved. Specifically, in zooming from a wide angle end to a telephoto end, the first lens unit, the second lens unit, and the third lens unit are moved so that an interval between the first lens unit and the second lens unit is larger at the telephoto end than that at wide angle end, while an interval between the second lens unit and the third lens unit is smaller at the telephoto end than that at the wide angle end. Further, the fourth lens unit moves along a locus different from that of the third lens unit so that an interval between the third lens unit and the fourth lens unit varies.

FIG. 1 illustrates lens cross sections at a wide angle end (short focal length end) (A), at a first intermediate zoom position (B), at a second intermediate zoom position (C), and at a telephoto end (long focal length end) (D), respectively of a zoom lens system according to a first embodiment of the present invention. FIGS. 2A, 2B, 2C, and 2D are aberration diagrams at the wide angle end, at the first intermediate zoom position, at the second intermediate zoom position, and at the telephoto end, respectively of the zoom lens system according to the first embodiment.

Figure 2A:
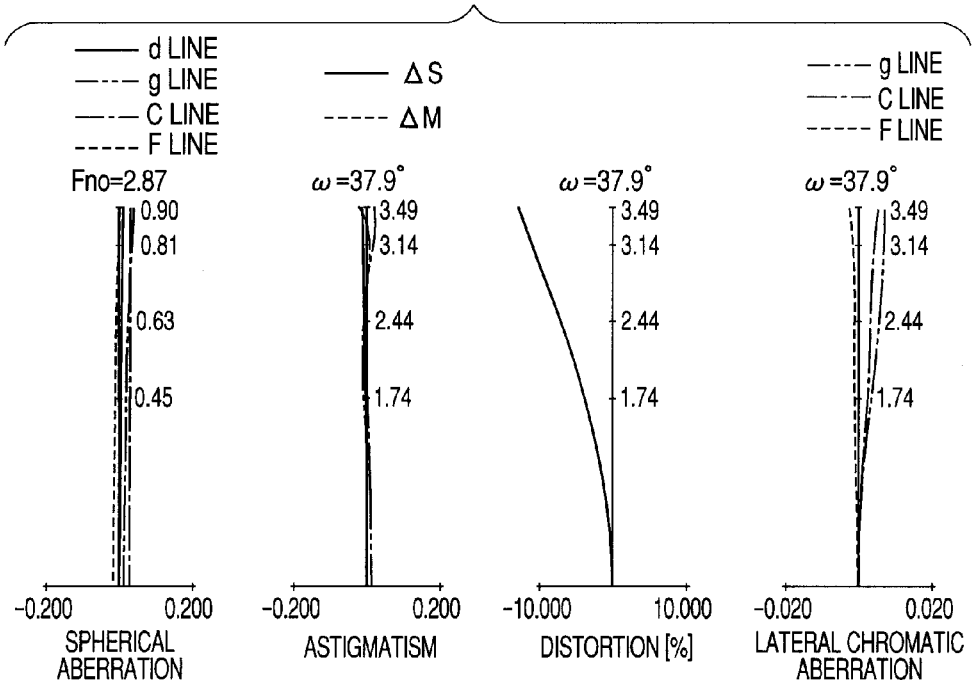
FIG. 2A is an aberration diagram at the wide angle end according to the first embodiment of the present invention.
Figure 2B:
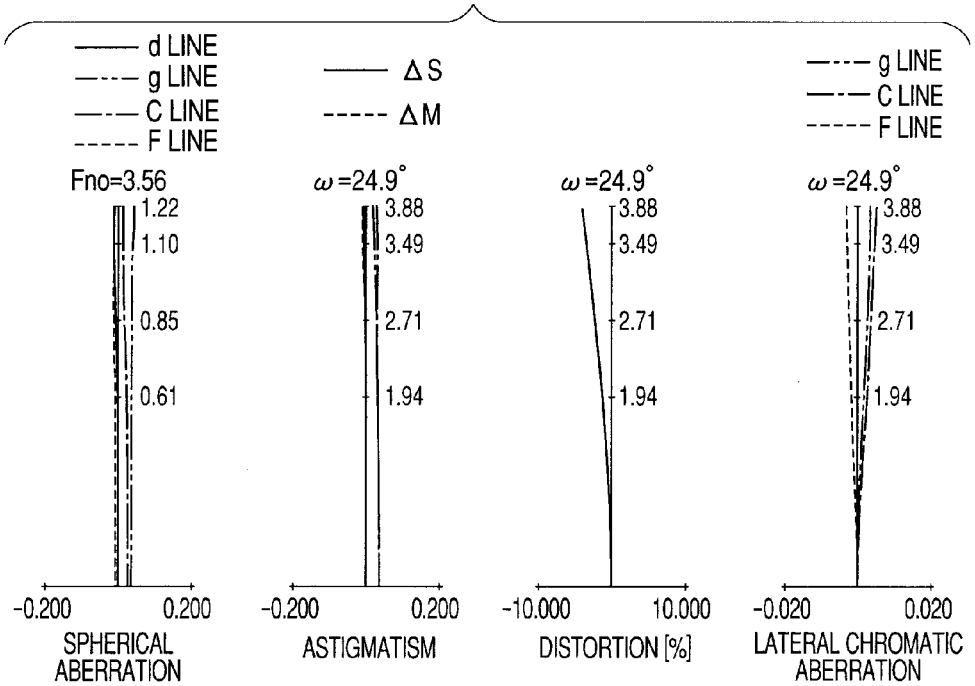
FIG. 2B is an aberration diagram at the first intermediate zoom position according to the first embodiment of the present invention.
Figure 2C:
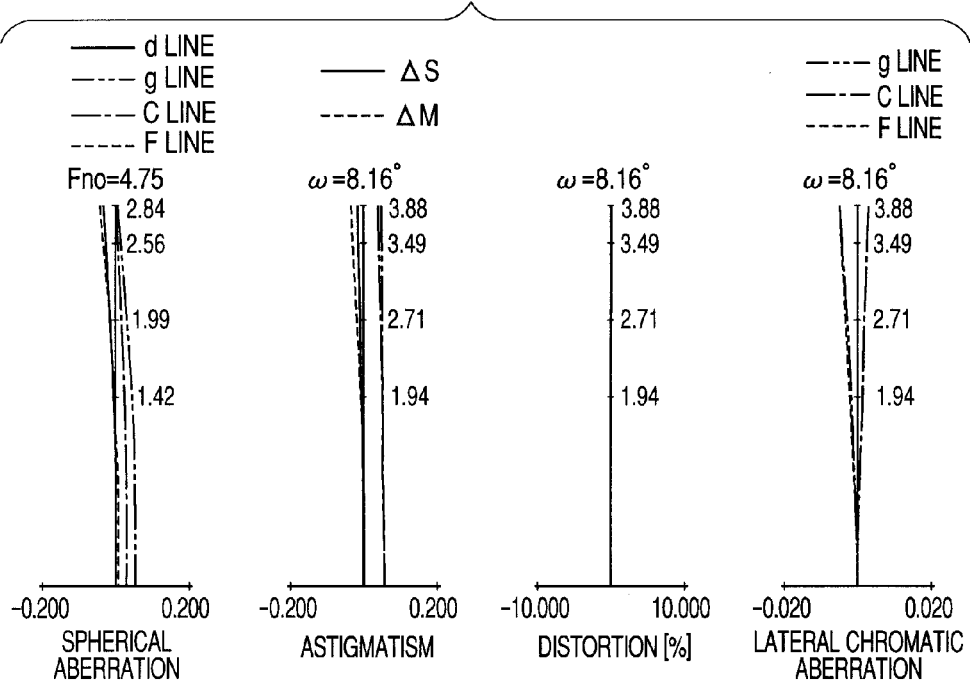
FIG. 2C is an aberration diagram at the second intermediate zoom position according to the first embodiment of the present invention.
Figure 2D:
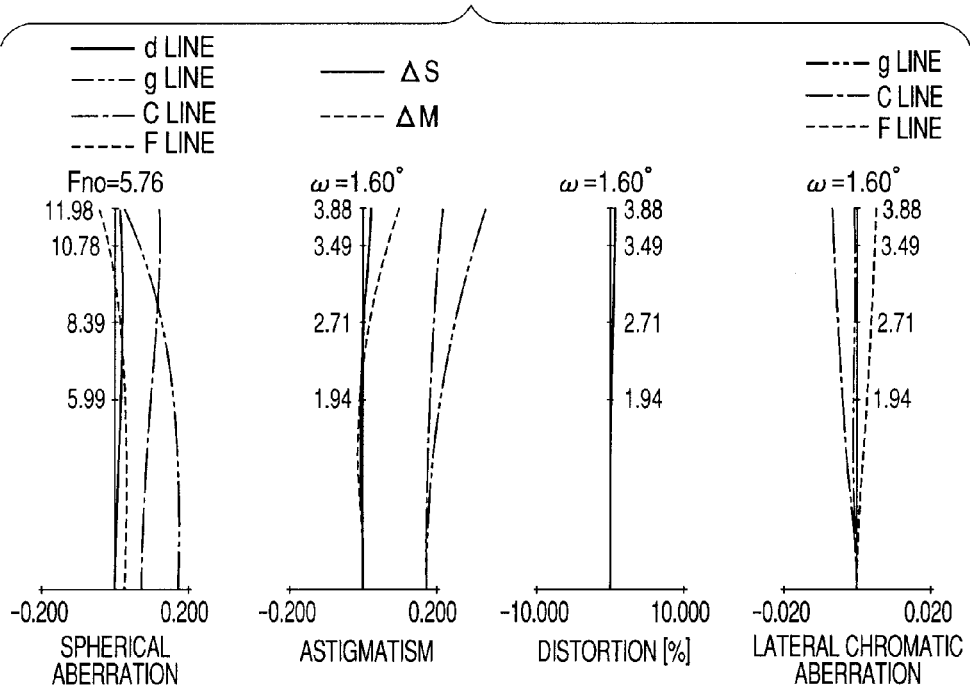
FIG. 2D is an aberration diagram at the telephoto end according to the first embodiment of the present invention.
Figure 3:
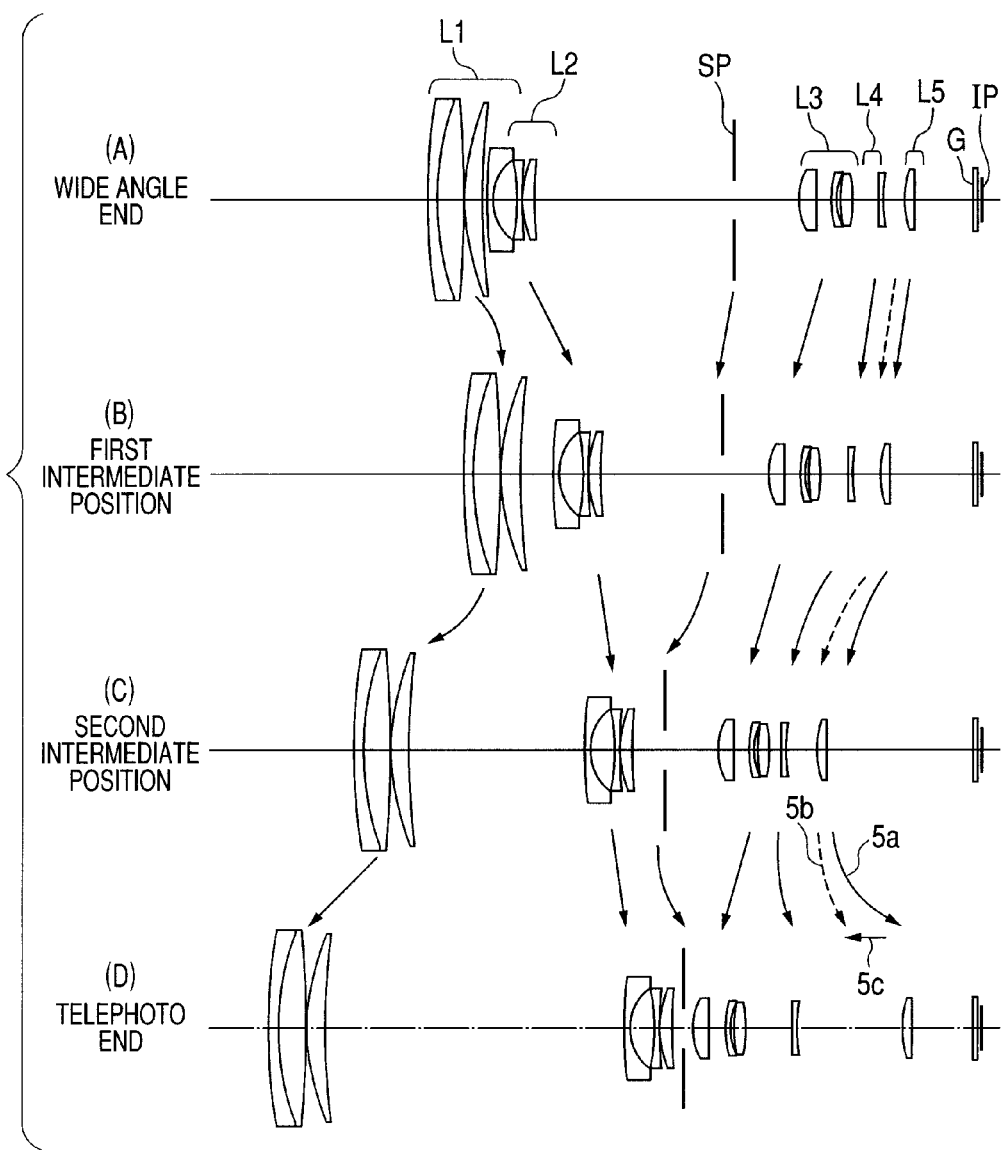
FIG. 3 illustrates lens cross sections at a wide angle end (A), at a first intermediate zoom position (B), at a second intermediate zoom position (C), and at a telephoto end (D), according to a second embodiment of the present invention.
Figure 4A:
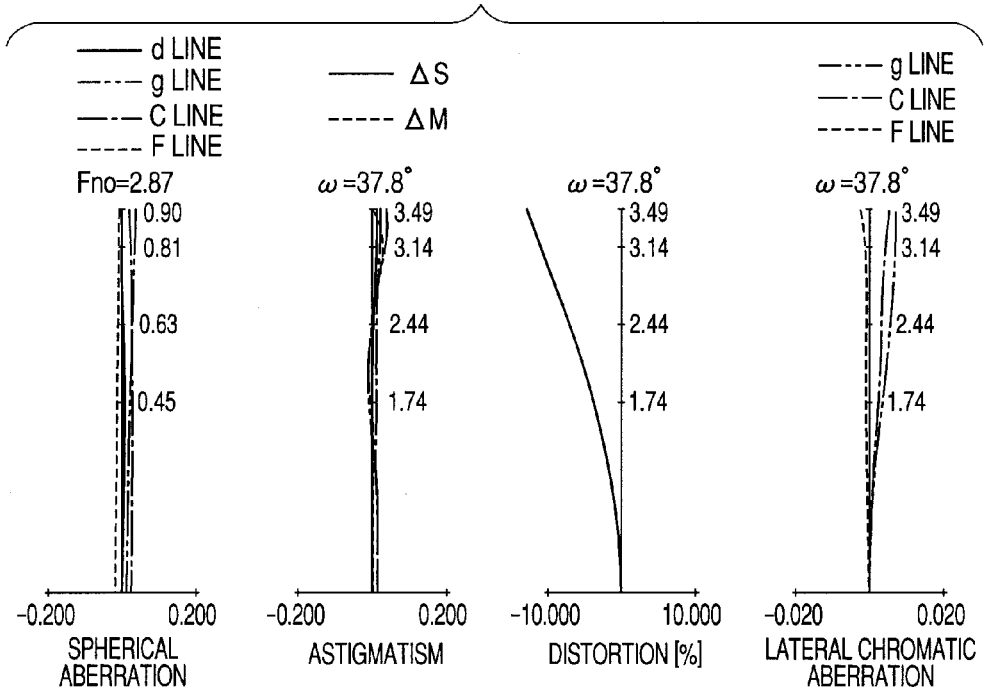
FIG. 4A is an aberration diagram at the wide angle end according to the second embodiment of the present invention.
Figure 4B:
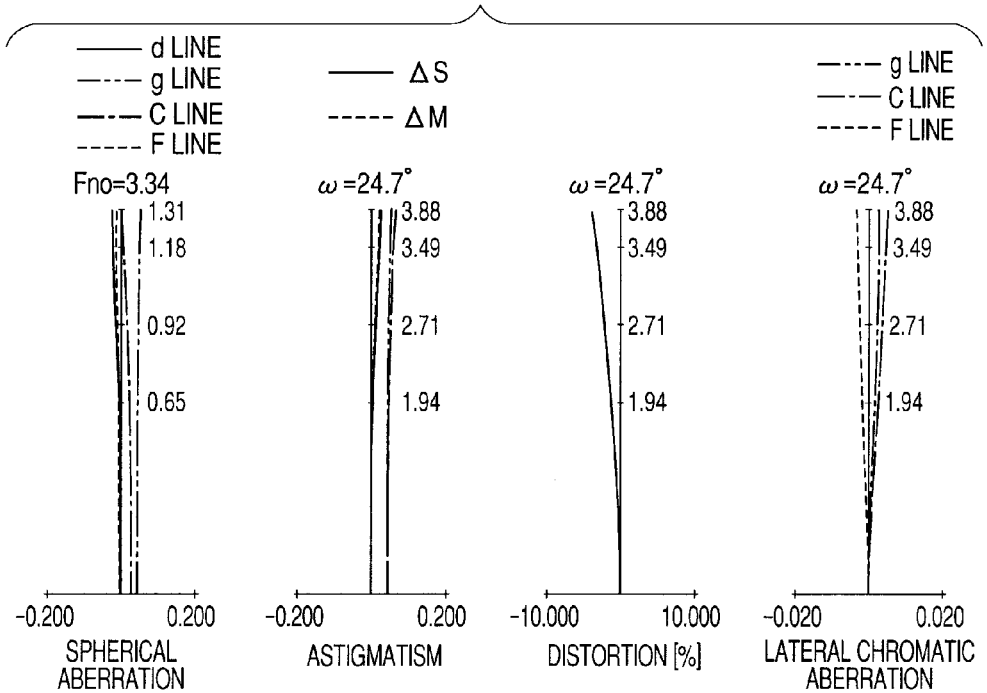
FIG. 4B is an aberration diagram at the first intermediate zoom position according to the second embodiment of the present invention.
Figure 4C:
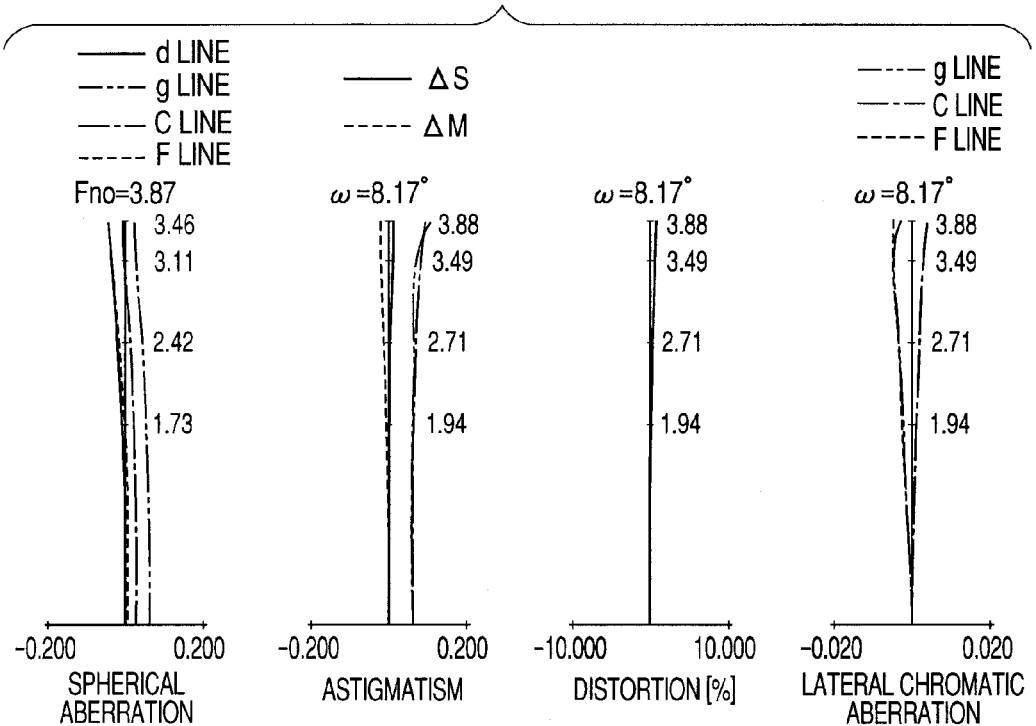
FIG. 4C is an aberration diagram at the second intermediate zoom position according to the second embodiment of the present invention.
Figure 4D:
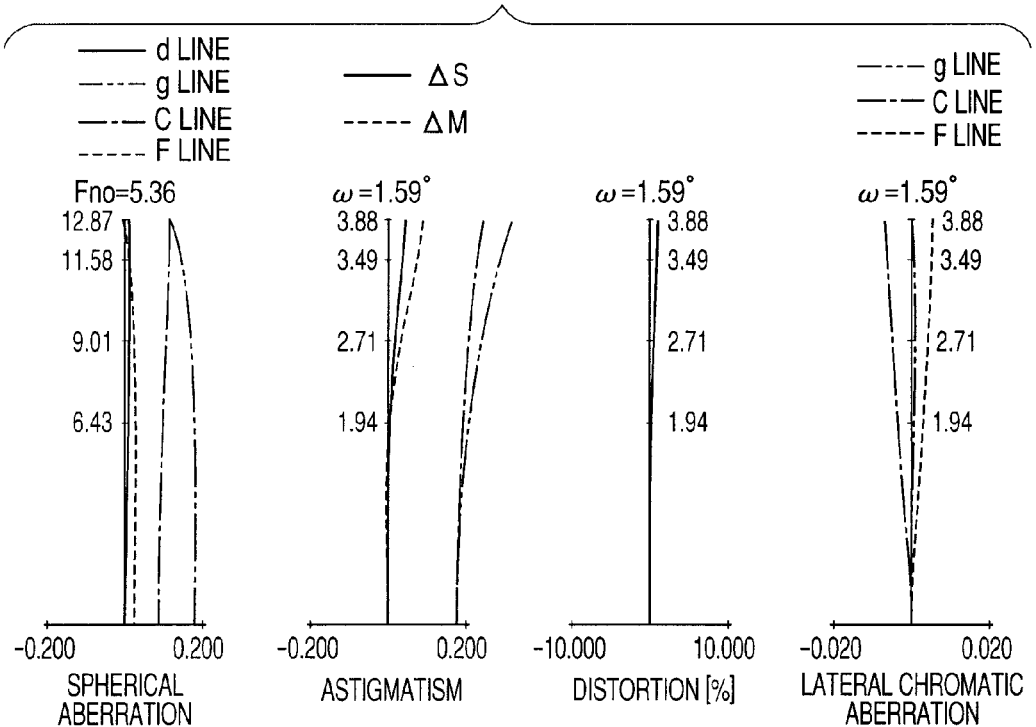
FIG. 4D is an aberration diagram at the telephoto end according to the second embodiment of the present invention.

FIG. 3 illustrates lens cross sections at a wide angle end (A), at a first intermediate zoom position (B), at a second intermediate zoom position (C), and at a telephoto end (D), respectively of a zoom lens system according to a second embodiment of the present invention. FIGS. 4A, 4B, 4C, and 4D are aberration diagrams at the wide angle end, at the first intermediate zoom position, at the second intermediate zoom position, and at the telephoto end, respectively of the zoom lens system according to the second embodiment.

Figure 5:
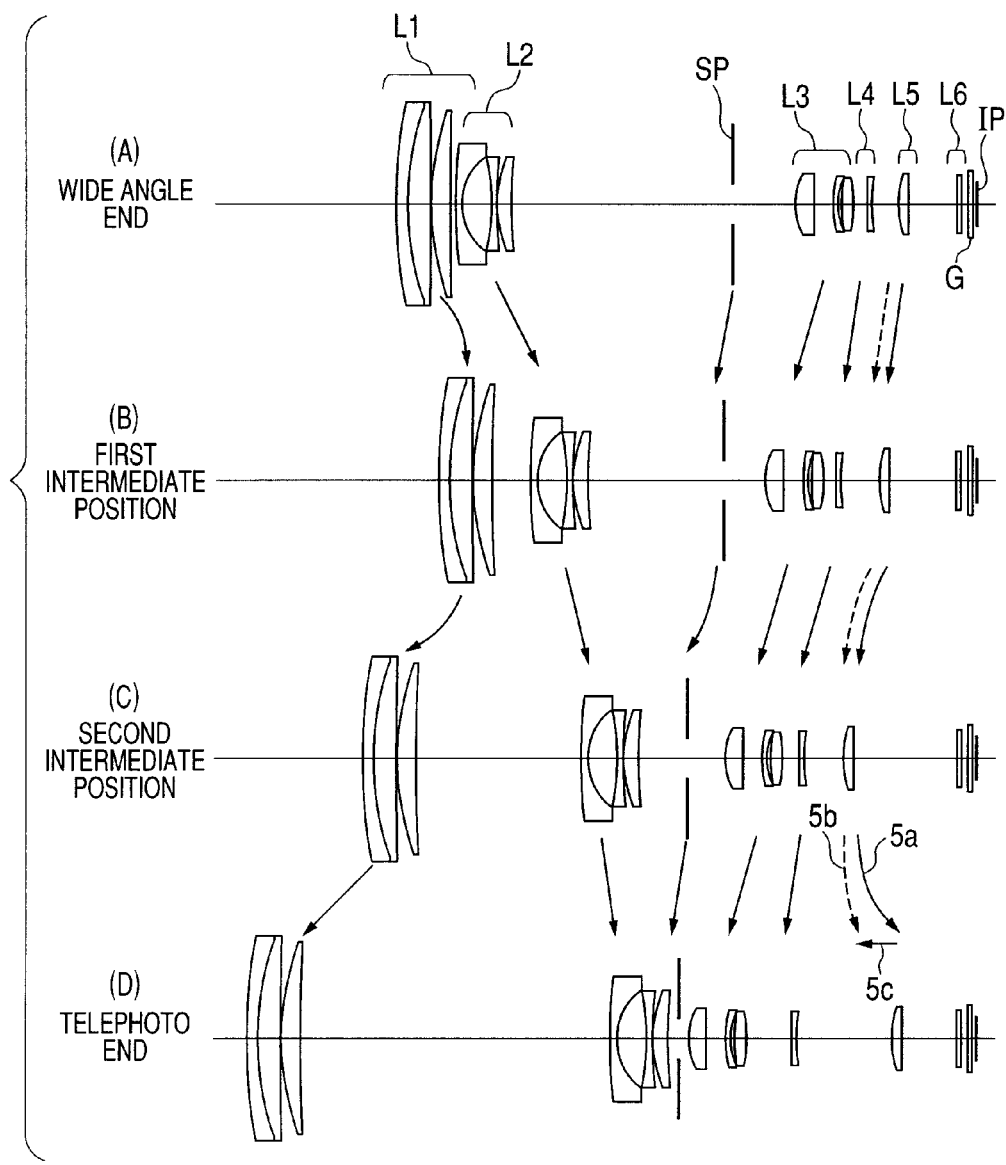
FIG. 5 illustrates lens cross sections at a wide angle end (A), at a first intermediate zoom position (B), at a second intermediate zoom position (C), and at a telephoto end (D), according to a third embodiment of the present invention.
Figure 6A:
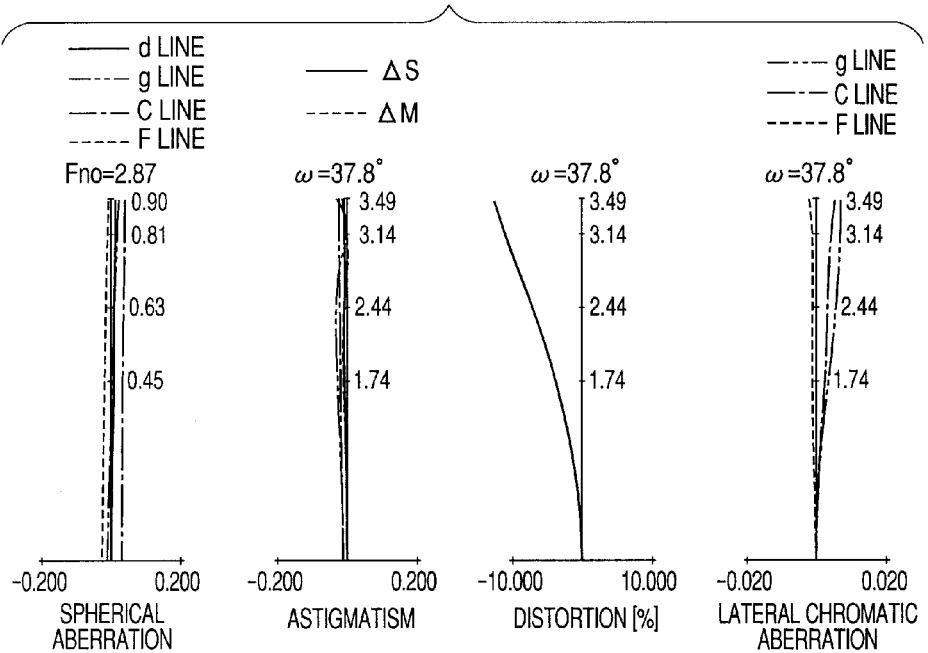
FIG. 6A is an aberration diagram at the wide angle end according to the third embodiment of the present invention.
Figure 6B:
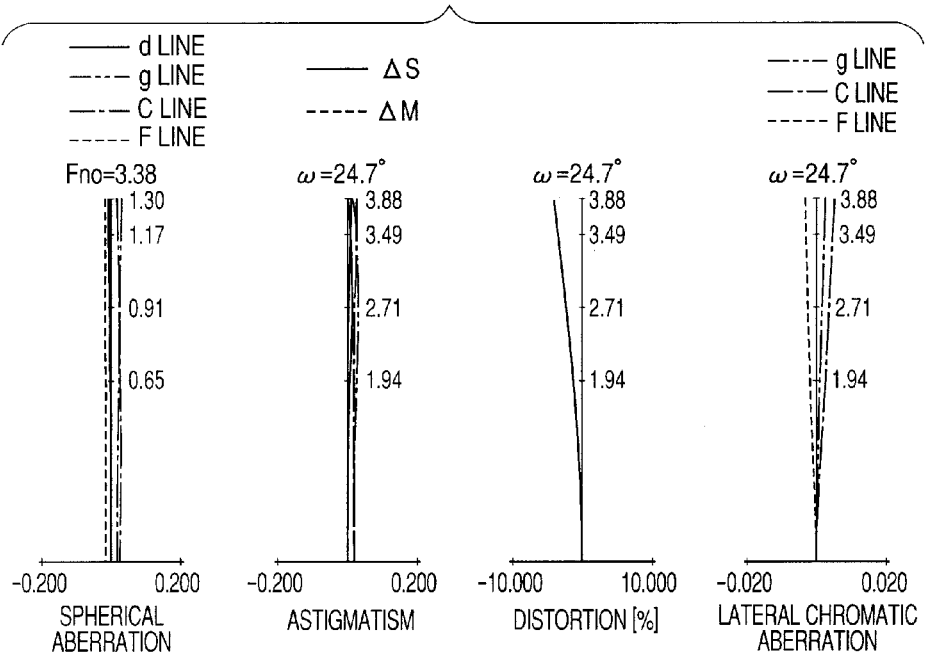
FIG. 6B is an aberration diagram at the first intermediate zoom position according to the third embodiment of the present invention.

FIG. 5 illustrates lens cross sections at a wide angle end (A), at a first intermediate zoom position (B), at a second intermediate zoom position (C), and at a telephoto end (D), respectively of a zoom lens system according to a third embodiment of the present invention.

FIGS. 6A, 6B, 6C, and 6D are aberration diagrams at the wide angle end, at the first intermediate zoom position, at the second intermediate zoom position, and at the telephoto end, respectively of the zoom lens system according to the third embodiment.

Figure 7:
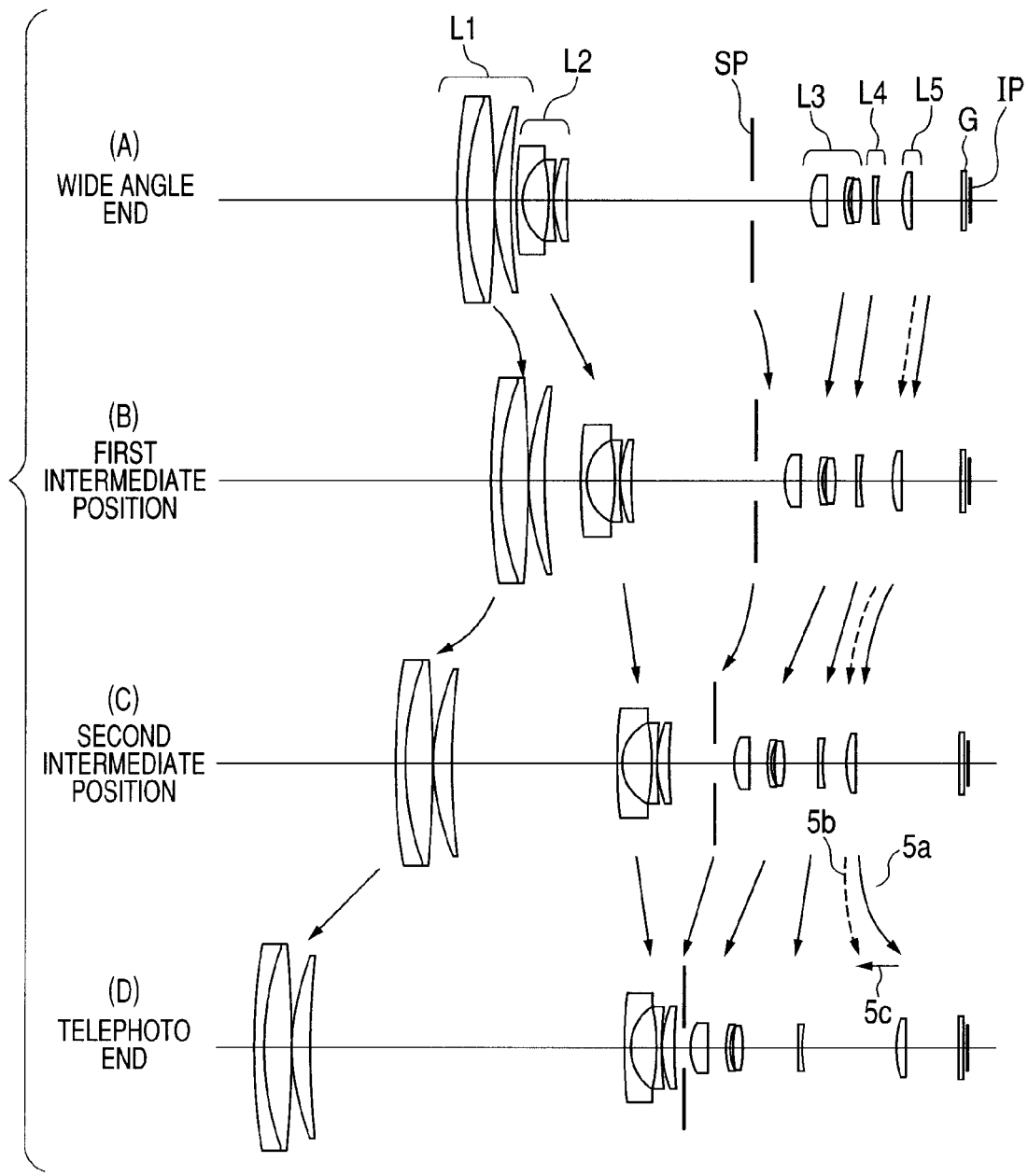
FIG. 7 illustrates lens cross sections at a wide angle end (A), at a first intermediate zoom position (B), at a second intermediate zoom position (C), and at a telephoto end (D), according to a fourth embodiment of the present invention.
Figure 8C:
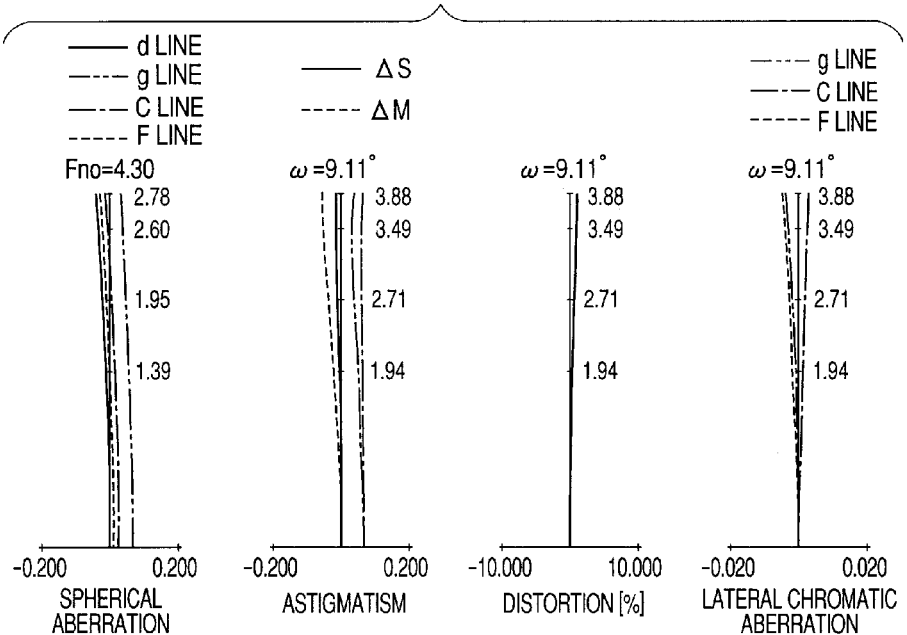
FIG. 8C is an aberration diagram at the second intermediate zoom position according to the fourth embodiment of the present invention.
Figure 8D:
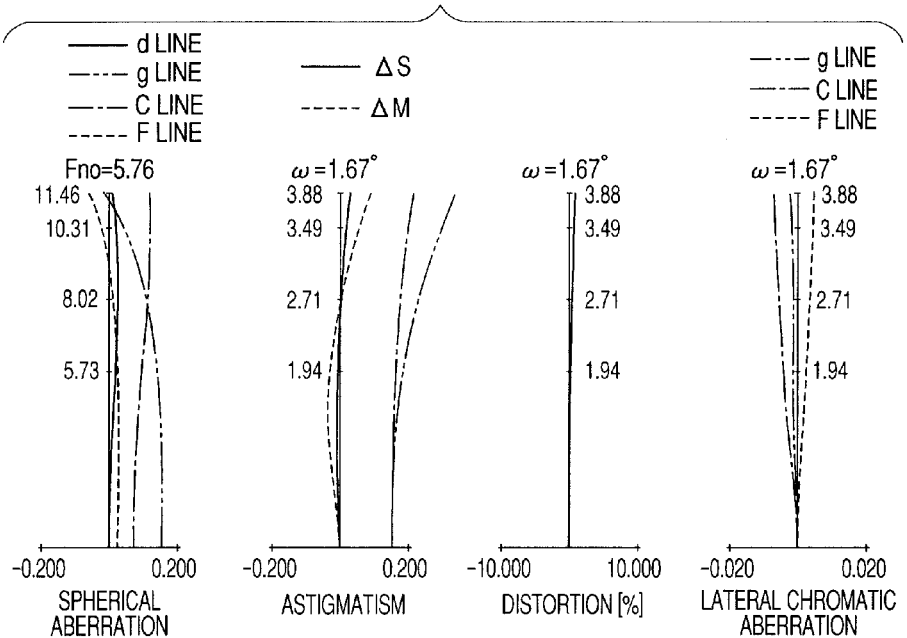
FIG. 8D is an aberration diagram at the telephoto end according to the fourth embodiment of the present invention.

FIG. 7 illustrates lens cross sections at a wide angle end (A), at a first intermediate zoom position (B), at a second intermediate zoom position (C), and at a telephoto end (D), respectively of a zoom lens system according to a fourth embodiment of the present invention. FIGS. 8A, 8B, 8C, and 8D are aberration diagrams at the wide angle end, at the first intermediate zoom position, at the second intermediate zoom position, and at the telephoto end, respectively of the zoom lens system according to the fourth embodiment.

Figure 9:
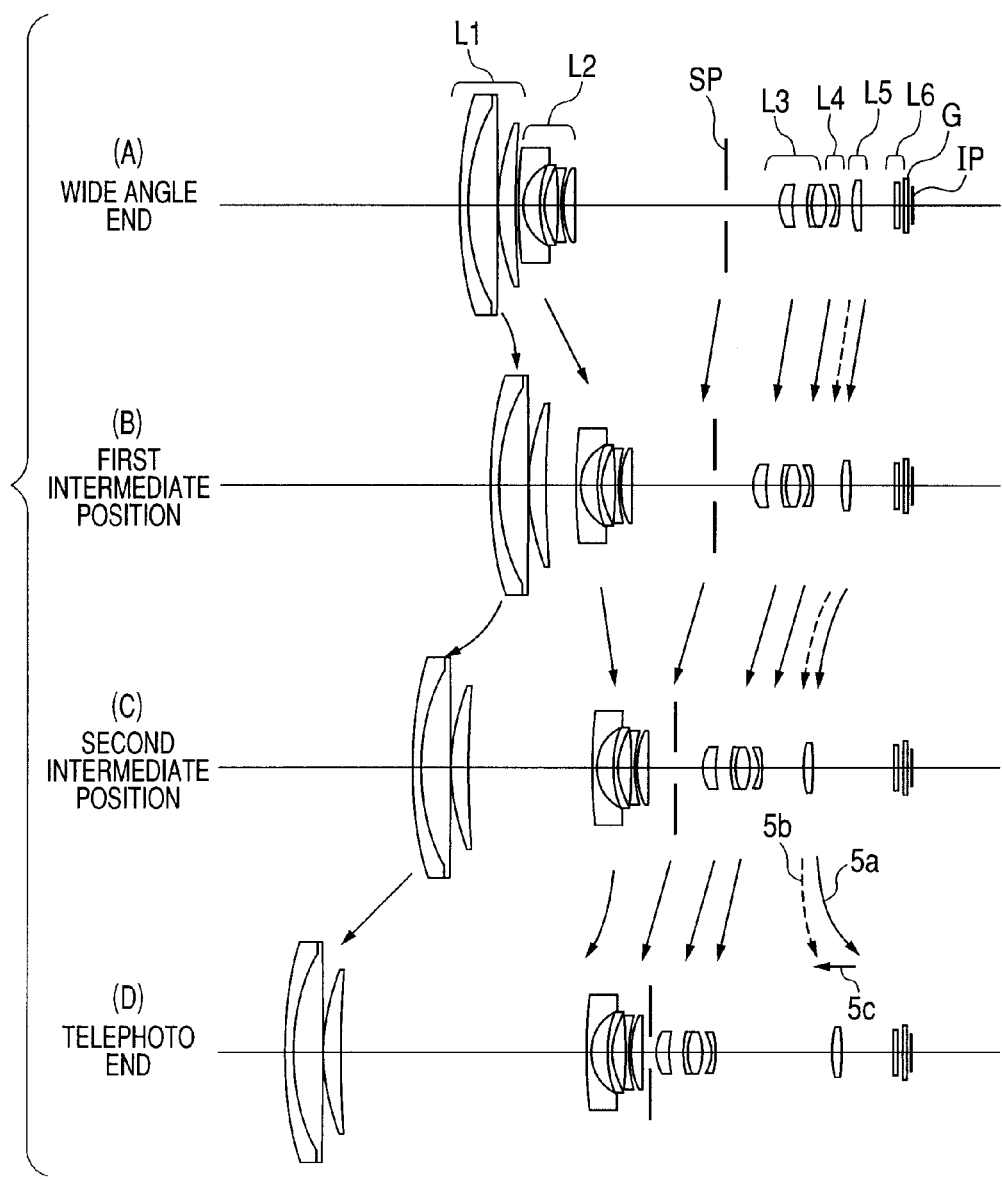
FIG. 9 illustrates lens cross sections at a wide angle end (A), at a first intermediate zoom position (B), at a second intermediate zoom position (C), and at a telephoto end (D), according to a fifth embodiment of the present invention.
Figure 10A:
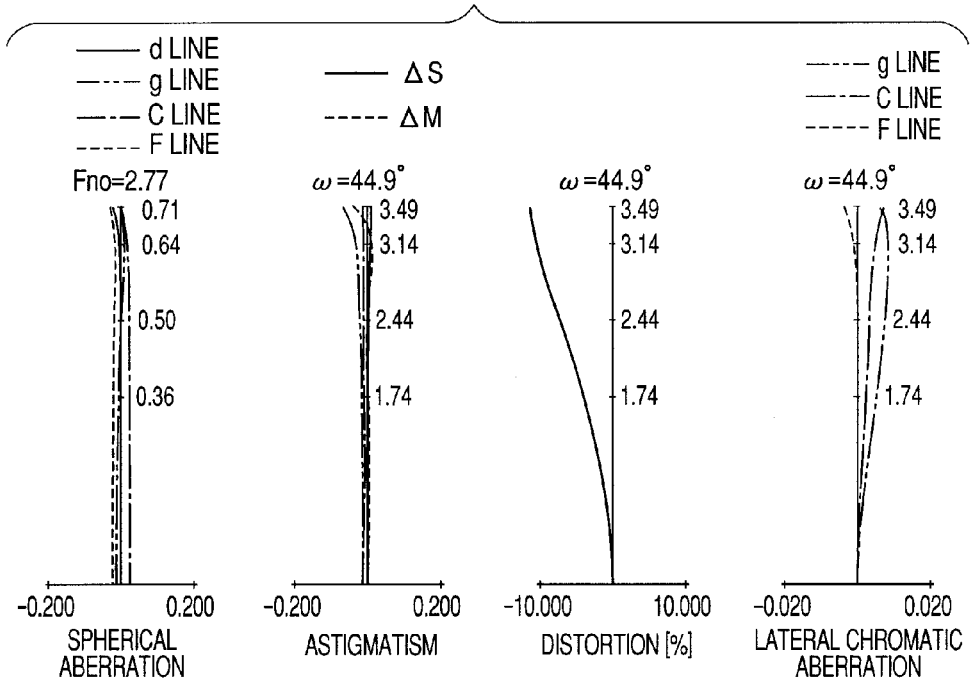
FIG. 10A is an aberration diagram at the wide angle end according to the fifth embodiment of the present invention.
Figure 10B:
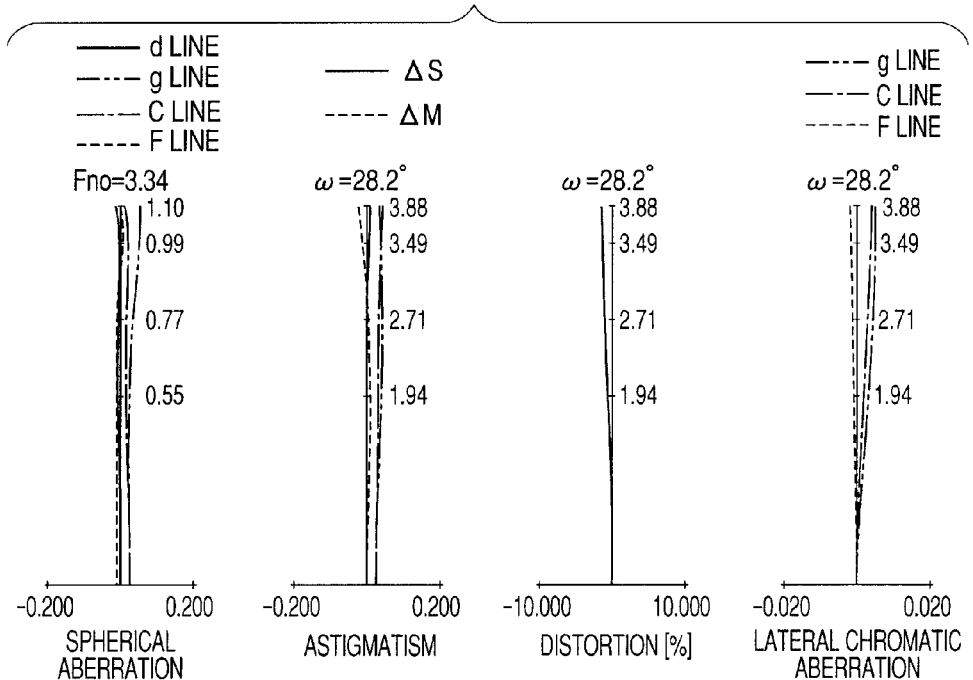
FIG. 10B is an aberration diagram at the first intermediate zoom position according to the fifth embodiment of the present invention.

FIG. 9 illustrates lens cross sections at a wide angle end (A), at a first intermediate zoom position (B), at a second intermediate zoom position (C), and at a telephoto end (D), respectively of a zoom lens system according to a fifth embodiment of the present invention. FIGS. 10A, 10B, 10C, and 10D are aberration diagrams at the wide angle end, at the first intermediate zoom position, at the second intermediate zoom position, and at the telephoto end, respectively of the zoom lens system according to the fifth embodiment.

Figure 11:
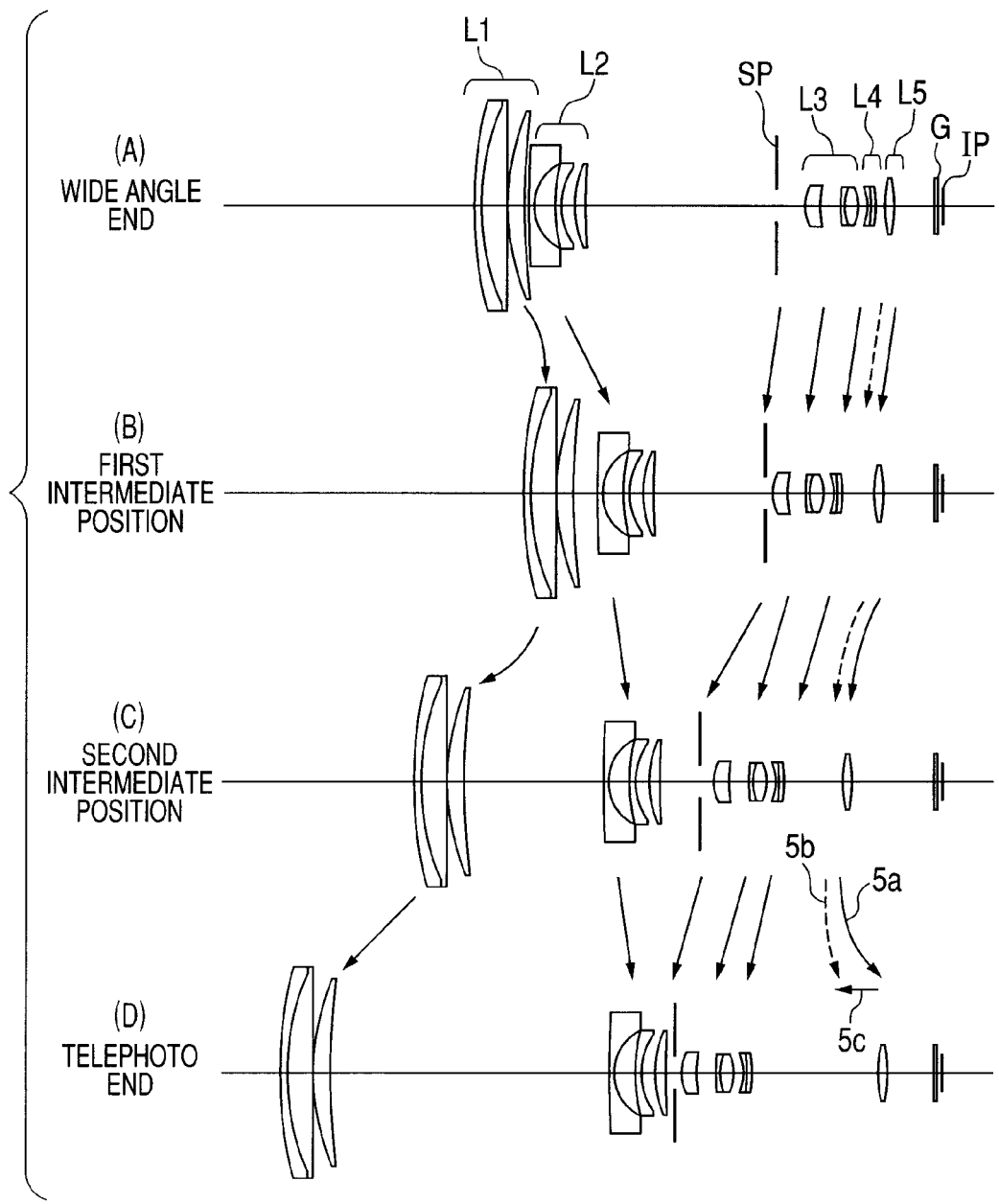
FIG. 11 illustrates lens cross sections at a wide angle end (A), at a first intermediate zoom position (B), at a second intermediate zoom position (C), and at a telephoto end (D), according to a sixth embodiment of the present invention.
Figure 12A:
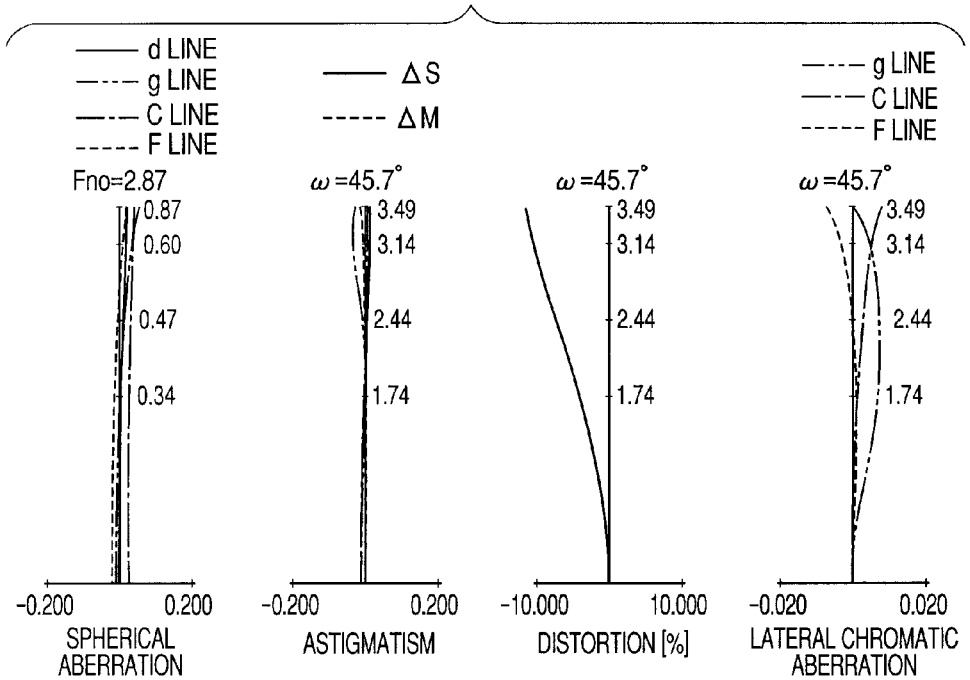
FIG. 12A is an aberration diagram at the wide angle end according to the sixth embodiment of the present invention.
Figure 12B:
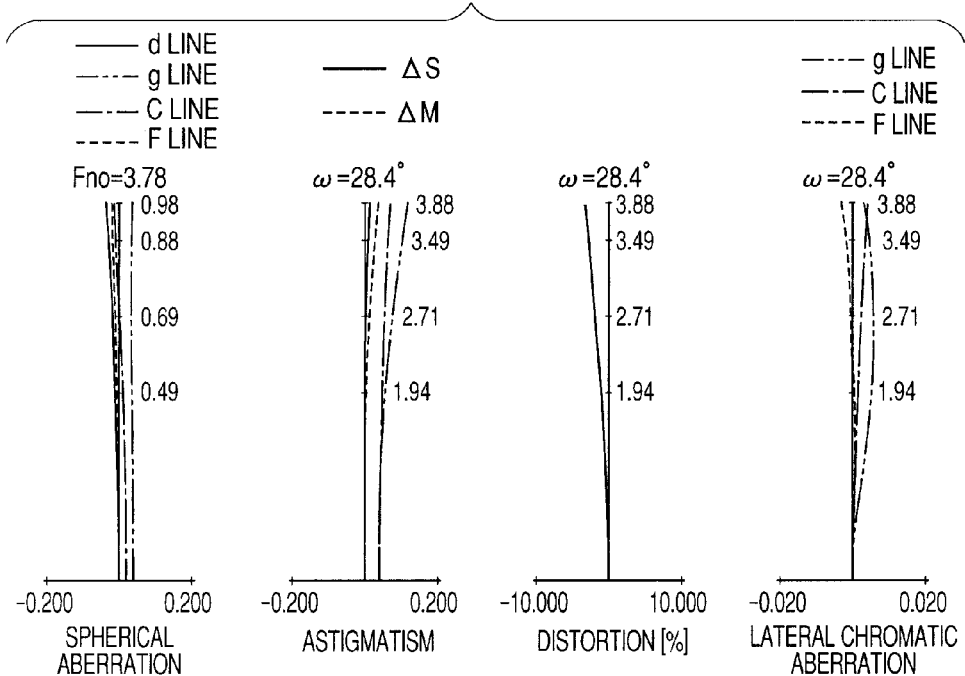
FIG. 12B is an aberration diagram at the first intermediate zoom position according to the sixth embodiment of the present invention.
Figure 12C:
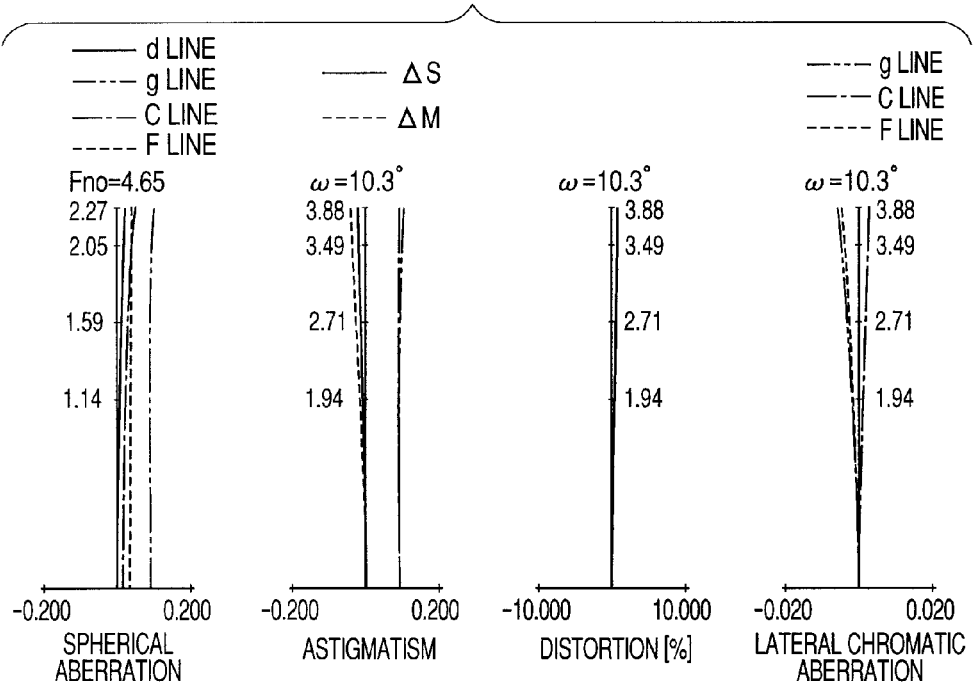
FIG. 12C is an aberration diagram at the second intermediate zoom position according to the sixth embodiment of the present invention.
Figure 12D:
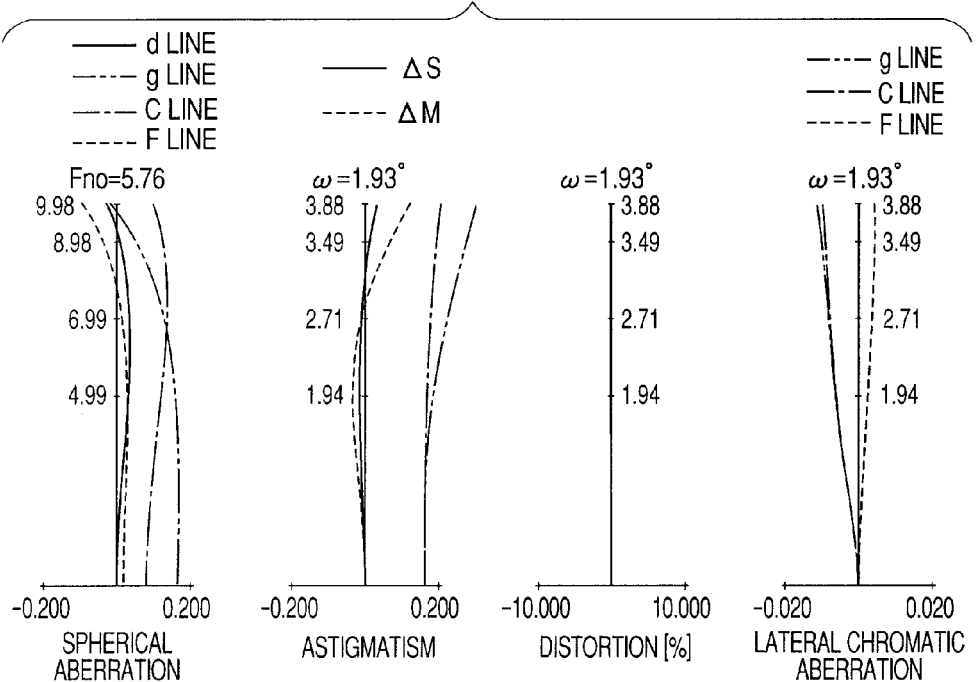
FIG. 12D is an aberration diagram at the telephoto end according to the sixth embodiment of the present invention.

FIG. 11 illustrates lens cross sections at a wide angle end (A), at a first intermediate zoom position (B), at a second intermediate zoom position (C), and at a telephoto end (D), respectively of a zoom lens system according to a sixth embodiment of the present invention. FIGS. 12A, 12B, 12C, and 12D are aberration diagrams at the wide angle end, at the first intermediate zoom position, at the second intermediate zoom position, and at the telephoto end, respectively of the zoom lens system according to the sixth embodiment.

Figure 13:
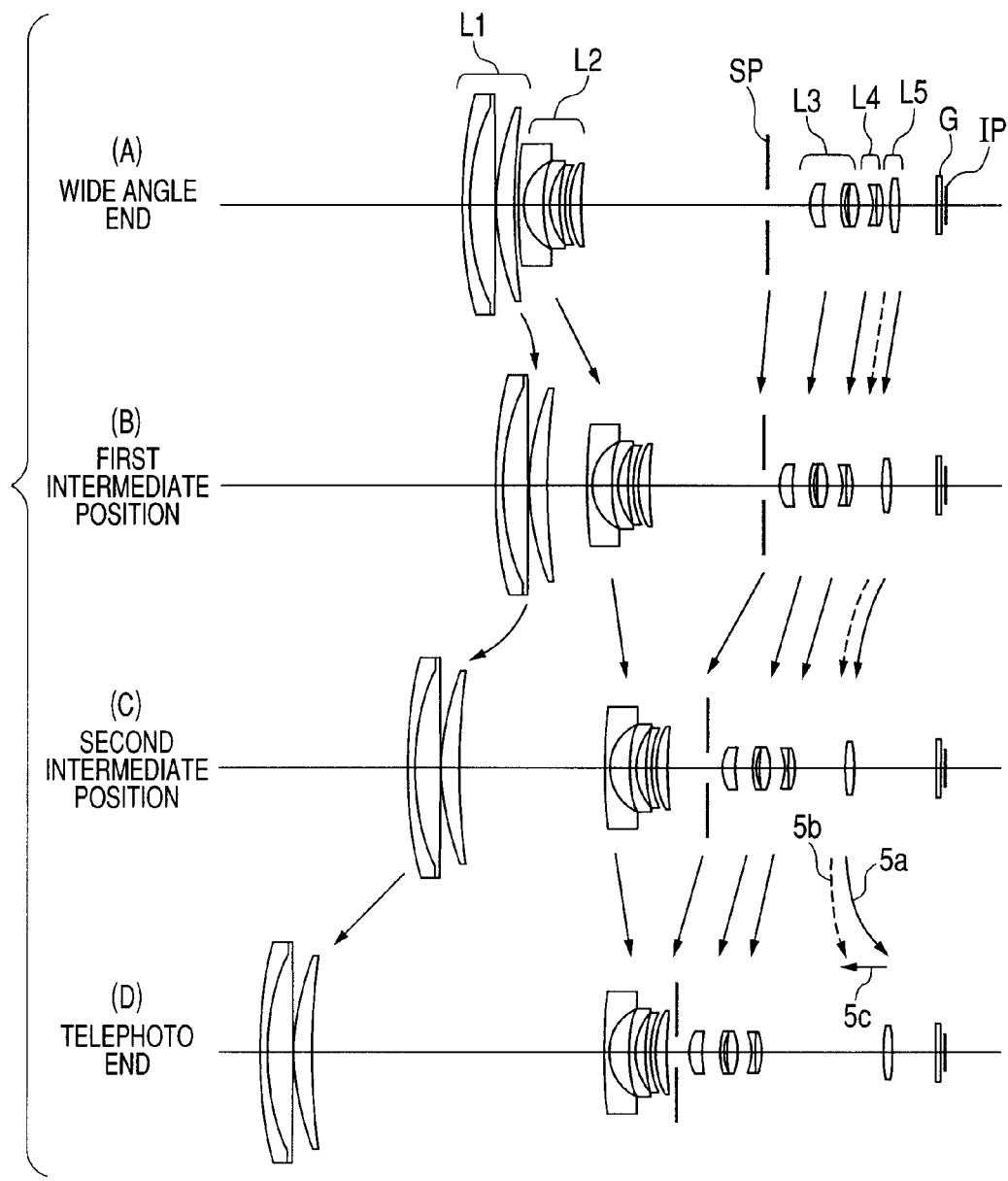
FIG. 13 illustrates lens cross sections at a wide angle end (A), at a first intermediate zoom position (B), at a second intermediate zoom position (C), and at a telephoto end (D), according to a seventh embodiment of the present invention.
Figure 14A:
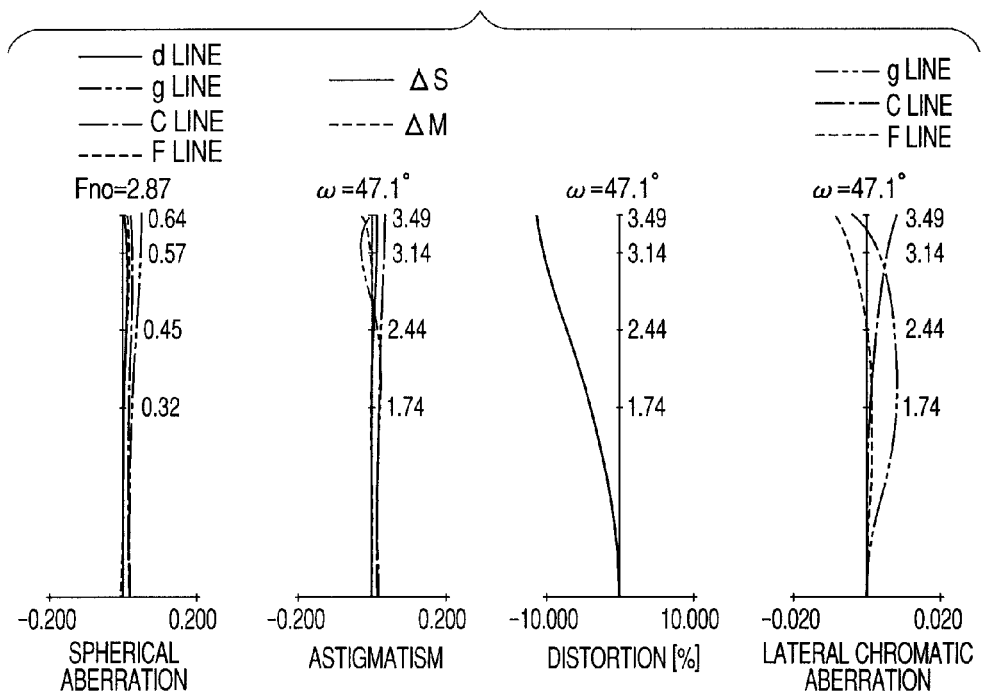
FIG. 14A is an aberration diagram at the wide angle end according to the seventh embodiment of the present invention.
Figure 14B:
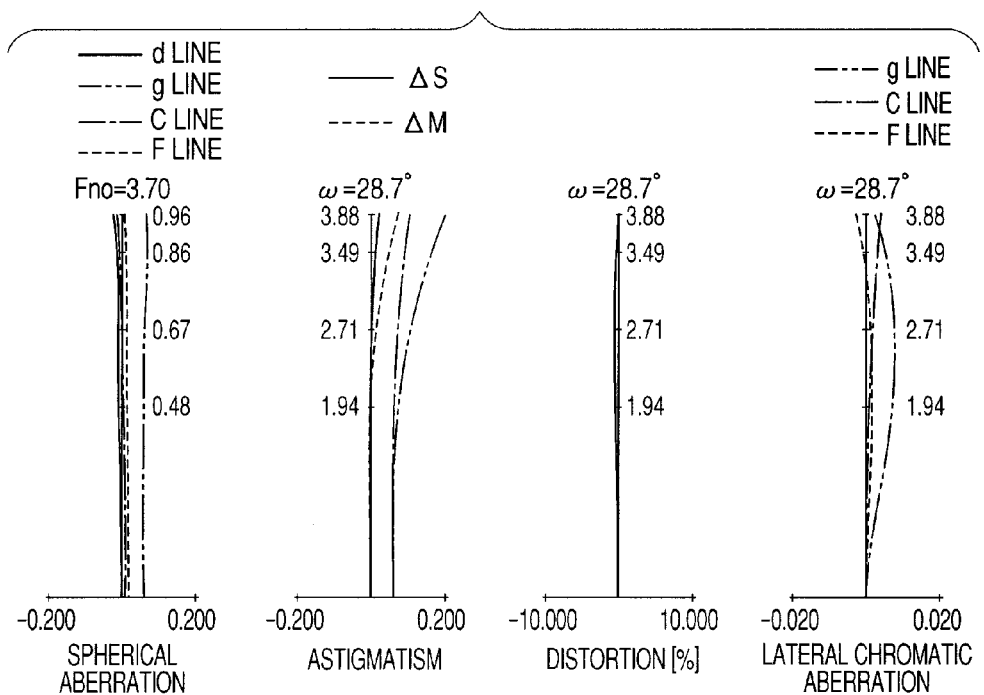
FIG. 14B is an aberration diagram at the first intermediate zoom position according to the seventh embodiment of the present invention.
Figure 14C:
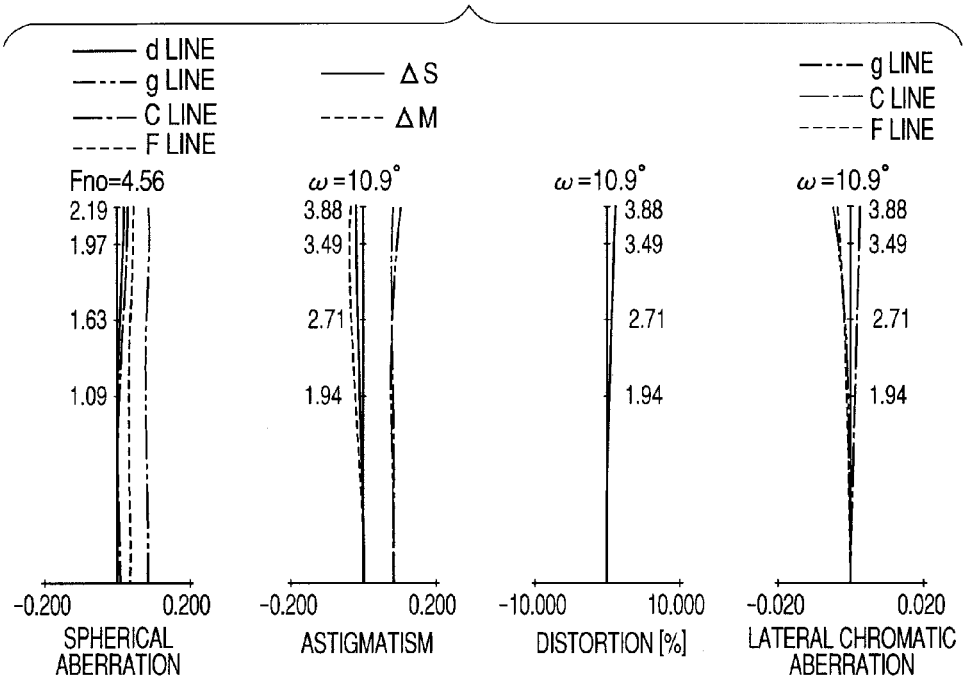
FIG. 14C is an aberration diagram at the second intermediate zoom position according to the seventh embodiment of the present invention.
Figure 14D:
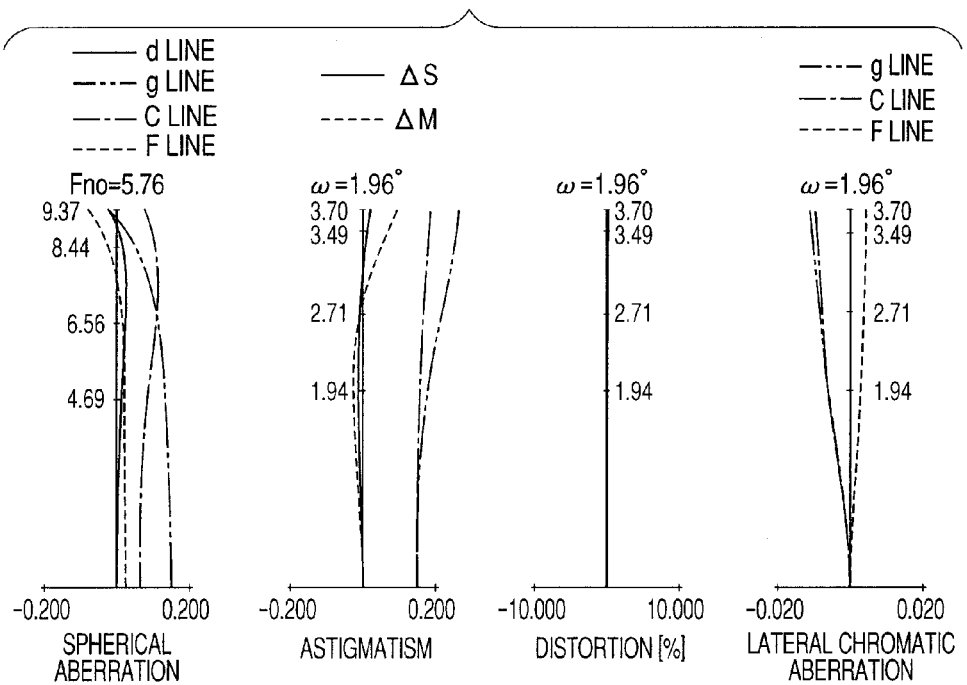
FIG. 14D is an aberration diagram at the telephoto end according to the seventh embodiment of the present invention.

FIG. 13 illustrates lens cross sections at a wide angle end (A), at a first intermediate zoom position (B), at a second intermediate zoom position (C), and at a telephoto end (D), respectively of a zoom lens system according to a seventh embodiment of the present invention. FIGS. 14A, 14B, 14C, and 14D are aberration diagrams at the wide angle end, at the first intermediate zoom position, at the second intermediate zoom position, and at the telephoto end, respectively of the zoom lens system according to the seventh embodiment.

Figure 15:
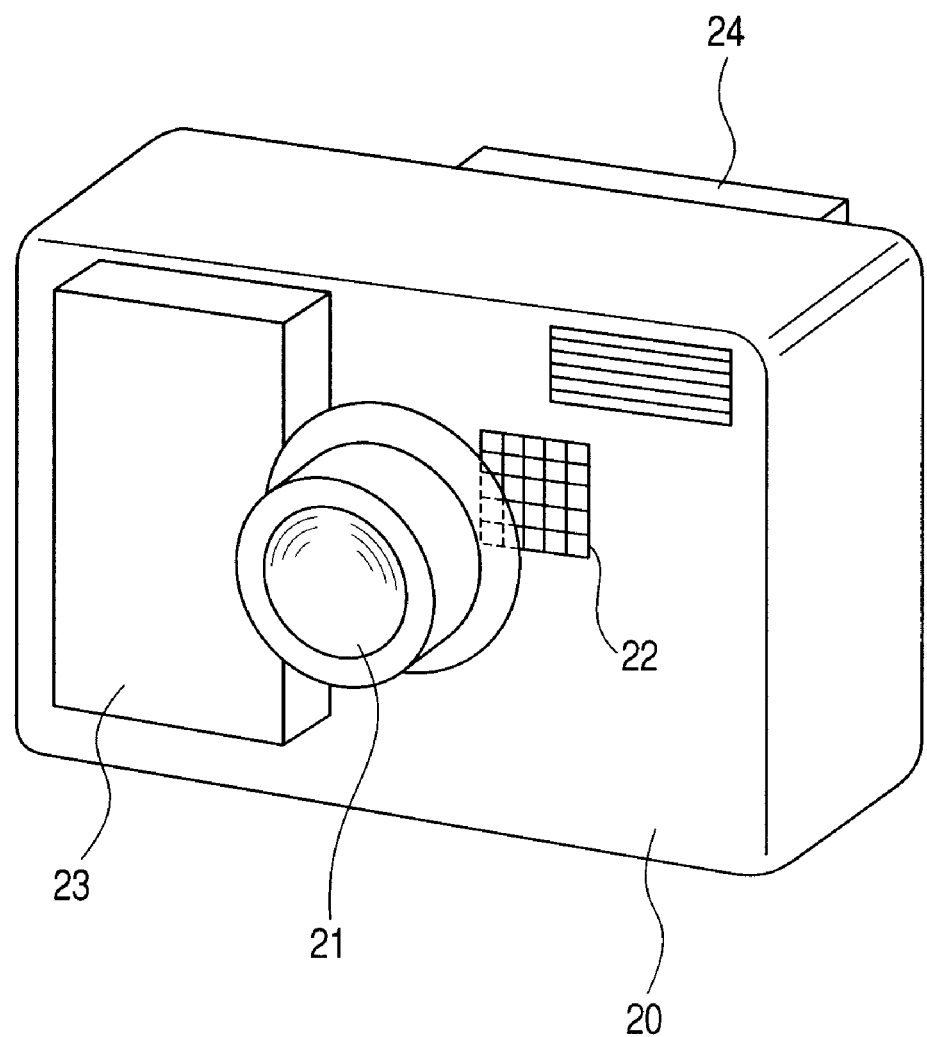
FIG. 15 is a schematic view illustrating a main portion in which the zoom lens system according to the present invention is applied to a digital camera.

FIG. 15 is a schematic view illustrating a main portion of a camera (image pickup apparatus) including the zoom lens system of the present invention. The zoom lens system of each embodiment is a photographing lens system that is used for an image pickup apparatus such as a video camera, a digital camera, and a silver-halide film camera. In the lens cross sections, the left side corresponds to a subject side (object side) (front side), while the right side corresponds to an image side (rear side). In the lens cross sections, i indicates an order of the lens unit from the object side, and Li represents an i-th lens unit. In the lens cross sections of the first, second, fourth, sixth, and seventh embodiments illustrated in FIGS. 1, 3, 7, 11, and 13, respectively, the zoom lens system includes a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. Each of those embodiments describes a positive-lead type five-unit zoom lens system.

In the lens cross sections of the third embodiment illustrated in FIG. 5, the zoom lens system includes a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having negative refractive power. The third embodiment describes a positive-lead type six-unit zoom lens system. In the lens cross sections of the fifth embodiment illustrated in FIG. 9, the zoom lens system includes a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having positive refractive power. The fifth embodiment describes a positive-lead type six-unit zoom lens system.

In each embodiment, an aperture stop SP is disposed on the object side of the third lens unit L3. An optical block G corresponds to an optical filter, a face plate, a crystal low-pass filter, an infrared cut filter, or the like. As an image plane IP, an imaging plane of a solid-state image pickup element (photoelectric transducer element) such as a charge coupled device (CCD) sensor or a complementary metal oxide semiconductor (CMOS) sensor is disposed when the zoom lens system is used as a photographing optical system of a video camera or a digital still camera. Alternatively, when the zoom lens system is used for a silver-halide film camera, the photosensitive surface corresponding to the film surface is disposed as an image plane IP. In the aberration diagrams, d, g, C, and F denote d-line, g-line, C-line, and F-line, respectively. $\Delta M$ and $\Delta S$ denote a meridional image plane and a sagittal image plane, respectively. Lateral chromatic aberration is expressed by the g-line, the C-line, and the F-line. Symbol $\omega$ denotes a half angle of field (half value of an angle of imaging field), and Fno denotes an F-number. Further, in each embodiment described below, the wide angle end and the telephoto end refer to zoom positions when the lens unit for magnification is positioned at each end of a mechanically movable range along an optical axis. In each embodiment, an arrow indicates a movement locus in zooming from the wide angle end to the telephoto end or in focusing.

In each embodiment, when zooming is performed, at least the first lens unit L1 to the fourth lens unit L4 move. In this case, an interval between the first lens unit L1 and the second lens unit L2 is larger at the telephoto end than at the wide angle end while an interval between the second lens unit L2 and the third lens unit L3 is smaller at the telephoto end than at the wide angle end. Specifically, in zooming from the wide angle end to the telephoto end, the first lens unit L1 moves along a locus convex toward the image side as illustrated by the arrow. Here, the zoom position where the first lens unit L1 is closest to the image plane during zooming is the first intermediate zoom position. The focal lengths of the entire system at the wide angle end and the telephoto end are denoted by fw and ft, respectively. In this case, when the focal length of the entire system is fm2, the zoom position of the focal length fm2 satisfying the following equation (A) is the second intermediate zoom position.

$$fm2 = (fw \times ft)^{1/2} \qquad (A)$$

The second lens unit L2 moves toward the image side in a non-linear manner. The third lens unit L3 moves toward the object side. The fourth lens unit L4 moves monotonously toward the object side along a locus different from that of the third lens unit L3 or moves along a locus convex toward the object side. The movement locus of the fourth lens unit L4 is a convex locus toward the object side, and hence a space between the third lens unit L3 and the fourth lens unit L4 is utilized effectively to decrease the total lens length effectively. The fifth lens unit L5 moves along a locus convex toward the object side so as to correct an image plane variation accompanying magnification. In addition, a rear focus type is adopted in which the fifth lens unit L5 is moved on the optical axis for focusing. Focusing at the telephoto end from an object at infinity to an object at a short distance, is performed by driving the fifth lens unit L5 to the front side as illustrated by an arrow 5c in each lens cross section. A solid line curve 5a and a dotted line curve 5b concerning the fifth lens unit L5 indicate a movement locus for correcting the image plane variation accompanying zooming from the wide angle end to the telephoto end when focused on the object at infinity or the object at a short distance, respectively. Note that, focusing may be performed by moving the fourth lens unit L4. In the third and fifth embodiments illustrated in FIGS. 5 and 9, respectively, the sixth lens unit L6 does not move for zooming. In each embodiment, the aperture stop SP is moved independently of lens units.

In the zoom lens system of each embodiment, there are provided at least five lens units from the object side to the image side, which include the first lens unit L1 having positive refractive power, the second lens unit L2 having negative refractive power, the third lens unit L3 having positive refractive power, the fourth lens unit L4 having negative refractive power, and the fifth lens unit L5 having positive refractive power. In this way, by disposing the fourth lens unit L4 having negative refractive power closer to the image plane side with respect to the aperture stop SP, a front lens effective diameter can be smaller than that of a four-unit zoom lens system including lens units having positive, negative, positive, and positive refractive powers, thereby realizing a wide angle of field easily. The reason is as follows. In case of off-axial light beams, the light beam height from the optical axis is inverted between the object side and the image plane with respect to the aperture stop SP. The off-axial light beam is subjected to diverging action when passing through the lens unit having negative refractive power disposed on the image plane side with respect to the aperture stop SP whereas the off-axial light beam on the object side of the aperture stop SP whose light beam height is inverted is subjected to converging action. Therefore, in a lens configuration including the fourth lens unit L4 having negative refractive power on the image plane side with respect to the aperture stop SP, an incident height of the off-axial light beam that passes through the front lens (first lens unit L1) can be configured small. In addition, in each embodiment, the first lens unit L1, the second lens unit L2, and the third lens unit L3 are moved for zooming.

In this case, the interval between the first lens unit L1 and the second lens unit L2 is increased at the telephoto end with respect to at the wide angle end, to thereby increase a magnification ratio of the second lens unit L2. Then, each lens unit is moved so that the interval between the second lens unit L2 and the third lens unit L3 is decreased. Thus, the third lens unit L3 is configured to have a magnification effect so that a fluctuation such as spherical aberration or field curvature accompanying zooming is effectively suppressed. In addition, the fourth lens unit L4 is moved along a locus different from that of the third lens unit L3, and the fourth lens unit L4 is configured to have the magnification effect, to thereby realize a high zoom ratio as the entire zoom lens system. In the five-unit zoom lens system or the six-unit zoom lens system described above, when trying to realize a high zoom ratio of 20 or more, much longitudinal chromatic aberration may occur at the telephoto end. In order to avoid the situation, it is preferred to weaken the refractive power of the first lens unit L1 in proportion to the magnification ratio.

However, if the refractive power of the first lens unit L1 is weakened, a movement amount of the first lens unit is increased accompanying zooming from the wide angle end to the telephoto end, and hence the total lens length is increased at the telephoto end. The increase in the total lens length causes not only difficulty in handling the photographing lens in photographing but also relative eccentricity between the first lens unit and lens units closer to the image plane than the first lens unit, which is easily generated by small clearance (looseness) between components constituting a lens barrel. As a result, deterioration of imaging performance or peripheral light amount is apt to occur easily. In addition, when trying to weaken the refractive power of the first lens unit L1 while trying to realize the wide angle of field whose half angle of field is approximately 35 degrees or larger at the wide angle end, the refractive powers of the third lens unit L3 and the fourth lens unit L4 become too strong to correct sufficiently a peripheral image plane variation and a flare in zooming. Therefore, in each embodiment, a focal length of the first lens unit L1 is denoted by f1, and focal lengths of the entire system at the wide angle end and the telephoto end are denoted by fw and ft, respectively. In this case, the following conditional expressions are satisfied.

$$8.0 < f1/fw < 25.0 \quad (1)$$

$$0.35 < f1/ft < 0.70 \quad (2)$$

Next, technical meanings of the conditional expressions (1) and (2) are described. The conditional expressions (1) and (2) define refractive powers of the first lens unit L1 with respect to the focal length of the entire system at the wide angle end and the telephoto end, respectively. If the refractive power of the first lens unit L1 becomes so small that the upper limit value in the conditional expression (1) is exceeded, refractive powers of the third lens unit L3 and the fourth lens unit L4 become too large for realizing the wide angle of field whose half angle of field is approximately 35 degrees or larger at the wide angle end, which is not desirable. As a result, it is difficult to correct sufficiently the peripheral image plane variation and the flare on a screen in zooming. In addition, the movement amount of the first lens unit L1 in zooming increases, and hence the total lens length and the front lens effective diameter increase. On the other hand, if the refractive power of the first lens unit L1 becomes so large that the lower limit value in the conditional expression (1) is exceeded, the incident height of the off-axial light beam at the first lens unit L1 increases. Then, much lateral chromatic aberration occurs at the wide angle end so that it is difficult to correct the lateral chromatic aberration by other lens units.

If the refractive power of the first lens unit L1 becomes so small that the upper limit value in the conditional expression (2) is exceeded, the movement amount of the first lens unit L1 in zooming increases so that the total lens length and the front lens effective diameter are increased. On the other hand, if the refractive power of the first lens unit L1 becomes so large that the lower limit value in the conditional expression (2) is exceeded, much longitudinal chromatic aberration occurs at the telephoto end so that it is difficult to achieve good optical performance in the entire zoom range. It is preferred to set the numerical value ranges in the conditional expressions (1) and (2) as follows.

$$10.0 < f1/fw < 23.0 \quad (1a)$$

$$0.4 < f1/ft < 0.7 \quad (2a)$$

It is more preferred to set the numerical value ranges in the conditional expressions (1a) and (2a) as follows.

$$12.0 < f1/fw < 22.0 \quad (1b)$$

$$0.45 < f1/ft < 0.70 \quad (2b)$$

In each embodiment, with the structure of each element as described above, the zoom lens system can be obtained, which has the small entire optical system, a wide angle of field and a high zoom ratio, and high optical performance with sufficiently corrected aberrations such as longitudinal chromatic aberration, lateral chromatic aberration, spherical aberration, and field curvature over the entire zoom range. In each embodiment, it is more preferred to satisfy at least one of the following conditions. The focal lengths of the second lens unit L2 and the fifth lens unit L5 are denoted by f2 and f5, respectively. The movement amounts of the first lens unit L1, the third lens unit L3, and the fourth lens unit L4 accompanying zooming from the wide angle end to the telephoto end are denoted by m1, m3, and m4, respectively. Note that, it is supposed that the sign of the movement amount is positive when the position of each of the lens units at the telephoto end is on the image plane side relative to the position of the lens unit at the wide angle end in the optical axis direction while the sign is negative if the position of the each of the lens units at the telephoto end is on the object side relative to the position of the lens unit at the wide angle end in the optical axis direction. The zoom position at which the first lens unit L1 is positioned closest to the image plane during zooming is regarded as the first intermediate zoom position, and in this case, the movement amount from the wide angle end to the first intermediate zoom position of the first lens unit L1 is denoted by m1mid. The sign of the movement amount is the same as described above. The sign is defined to be positive when the position of the lens unit at the first intermediate zoom position is on the image plane side of the position of the lens unit at the wide angle end, while the sign is defined to be negative when the position of the lens unit at the first intermediate zoom position is on the object side of the position of the lens unit at the wide angle end.

Lateral magnifications of the second lens unit L2 at the wide angle end and the telephoto end are denoted by $\beta 2w$ and $\beta 2t$, respectively. Lateral magnifications of the third lens unit L3 at the wide angle end and the telephoto end are denoted by $\beta 3w$ and $\beta 3t$, respectively. Lateral magnifications of the fourth lens unit L4 at the wide angle end and the telephoto end are denoted by $\beta 4w$ and $\beta 4t$, respectively. The first lens unit L1 includes a cemented lens in which a negative lens G11 and a positive lens G12 are cemented. An Abbe number of material forming the positive lens G12 constituting the cemented lens is denoted by $vd1p$, and a partial dispersion ratio of the material is denoted by $\theta gF1p$. Here, the partial dispersion ratio $\theta gF$ is expressed by the equation $\theta gF=(Ng-NF)/(NF-NC)$, where refractive indexes on the C-line, the F-line, and the g-line are denoted by NC, NF, Ng, respectively. A distance between a first lens surface positioned closest to the object side in the first lens unit L1 and the image plane at the telephoto end is denoted by Lt. In this case, it is preferred to satisfy at least one of the following conditional expressions.

$$5.0 < f5/fw < 15.0 \quad (3)$$

$$0.4 < m4/m3 < 1.5 \quad (4)$$

$$-12.0 < f1/f2 < -4.0 \quad (5)$$

$$1.0 < m1/m3 < 2.7 \quad (6)$$

$$0.05 < m1mid/|m1| < 0.60 \quad (7)$$

$$10 < (\beta 2t \times \beta 3t)/(\beta 2w \times \beta 3w) < 40 \quad (8)$$

$$2.8 < f2/fw < -1.5 \quad (9)$$

$$1.0 < \beta 4t/\beta 4w < 3.0 \quad (10)$$

$$-0.0016 vd1p + 0.641 < \theta gF1p \quad (11)$$

$$0.7 < Lt/ft < 1.4 \quad (12)$$

$$1.5 < (\beta 2t/\beta 2w)/(\beta 3t/\beta 3w) < 5.0 \quad (13)$$

Next, technical meanings of the above-mentioned conditional expressions are described.

The conditional expression (3) defines a refractive power of the fifth lens unit L5. If the refractive power of the fifth lens unit L5 becomes so small that the upper limit value in the conditional expression (3) is exceeded, the image plane variation accompanying the magnification cannot be sufficiently corrected by the fifth lens unit L5, in particular in the zoom range close to the telephoto end. As a result, a movement amount of the fifth lens unit L5 in zooming becomes too large so that the total lens length is increased, which is not desirable. In addition, in the zoom range close to the telephoto end, a movement amount of the fifth lens unit L5 accompanying focusing becomes too large to set a distance to an object at a short distance that can be shot to a short value. On the other hand, if the refractive power of the fifth lens unit L5 becomes so large that the lower limit value in the conditional expression (3) is exceeded, variations of aberrations such as longitudinal chromatic aberration, lateral chromatic aberration, and field curvature accompanying focusing becomes too large, and hence optical performance of an object at a short distance is deteriorated.

The conditional expression (4) defines a movement amount of the fourth lens unit L4 with respect to the third lens unit L3 accompanying zooming. If the movement amount m4 of the fourth lens unit L4 accompanying zooming becomes so large that the upper limit value in the conditional expression (4) is exceeded, a fluctuation amount of field curvature generated in the fourth lens unit L4 accompanying zooming becomes too large, which can hardly be corrected by other lens units. On the other hand, if the movement amount m4 of the fourth lens unit L4 accompanying zooming becomes so small that the lower limit value in the conditional expression (4) is exceeded, a sufficient magnification ratio cannot be given to the fourth lens unit L4, and hence it is difficult to obtain a high zoom ratio.

The conditional expression (5) defines a ratio between refractive power of the first lens unit L1 and refractive power of the second lens unit L2. If the refractive power of the second lens unit L2 becomes so small that the upper limit value in the conditional expression (5) is exceeded, a movement amount of the second lens unit L2 for securing a necessary magnification ratio increases, and hence the total lens length and the front lens effective diameter are increased. On the other hand, if the refractive power of the second lens unit L2 becomes so large that the lower limit value in the conditional expression (5) is exceeded, much lateral chromatic aberration occurs in the second lens unit L2 accompanying zooming. In addition, fluctuation of the field curvature becomes too large, which can hardly be corrected by other lens units.

The conditional expression (6) defines movement amounts of the first lens unit L1 and the third lens unit L3 in zooming. If the movement amount of the first lens unit L1 accompanying zooming becomes so large that the upper limit value in the conditional expression (6) is exceeded, the total lens length is increased. In addition, on the other hand, if the movement amount of the first lens unit L1 becomes so small that the lower limit value in the conditional expression (6) is exceeded, it is difficult to obtain a sufficient magnification ratio by the second lens unit L2, and it is difficult to obtain a high zoom ratio.

The conditional expression (7) defines a movement locus of the first lens unit L1 accompanying zooming. The first lens unit L1 moves along a locus convex toward the image plane side in zooming. Thus, an entrance pupil distance is shortened in a range from the wide angle end to a vicinity of the first intermediate zoom position, to thereby realize a small front lens effective diameter. If a movement amount of the first lens unit L1 from the wide angle end to the first intermediate zoom position becomes so large that the upper limit value in the conditional expression (7) is exceeded, fluctuation of the field curvature becomes too large at a vicinity of the first intermediate zoom position that is an inflection point of the movement locus. The fluctuation can hardly be corrected by other lens units. On the other hand, if the movement amount of the first lens unit L1 toward the image plane side becomes so small that the lower limit value in the conditional expression (7) is exceeded, the incident height of the off-axial light beam passing through the front lens (first lens unit L1) at a vicinity of the first intermediate zoom position becomes high so that the front lens effective diameter is increased, which is not desirable.

The conditional expression (8) defines magnification ratios of the second lens unit L2 and the third lens unit L3. If the magnification ratios of the second lens unit L2 and the third lens unit L3 become so large that the upper limit value in the conditional expression (8) is exceeded, lateral chromatic aberration, spherical aberration, field curvature fluctuation, or the like accompanying zooming becomes too large, which can hardly be corrected by other lens units. If magnification ratios of the second lens unit L2 and the third lens unit L3 become so small that the lower limit value in the conditional expression (8) is exceeded, it is difficult to obtain a high zoom ratio.

The conditional expression (9) defines refractive power of the second lens unit L2. If the refractive power of the second lens unit L2 becomes so large that the upper limit value in the conditional expression (9) is exceeded, much lateral chromatic aberration or field curvature occurs in the second lens unit L2 at the wide angle end, which can hardly be corrected by other lens units. On the other hand, if the refractive power of the second lens unit L2 becomes so small that the lower limit value in the conditional expression (9) is exceeded, a movement amount of the second lens unit L2 for securing a necessary magnification ratio increases, and hence the total lens length and the front lens effective diameter are increased.

The conditional expression (10) defines a magnification ratio of the fourth lens unit L4. If the magnification ratio of the fourth lens unit L4 becomes so large that the upper limit value in the conditional expression (10) is exceeded, a fluctuation amount of field curvature generated in the fourth lens unit L4 becomes too large, which can hardly be corrected by other lens units. On the other hand, if the magnification ratio of the fourth lens unit L4 becomes so small that the lower limit value in the conditional expression (10) is exceeded, it is difficult to obtain a high zoom ratio.

The conditional expression (11) defines the material of the positive lens G12 constituting the cemented lens included in the first lens unit L1. If the partial dispersion ratio θgF1p of the material of the positive lens G12 becomes so small that the left side of the conditional expression (11) is exceeded, it is difficult to correct a secondary spectrum generated in the negative lens G11 constituting the cemented lens. In particular, at the telephoto end, secondary spectrums of longitudinal chromatic aberration and lateral chromatic aberration are increased. As a result, in particular, at the telephoto end, color or resolution at the contour of the shot image is deteriorated, and hence it is difficult to obtain high optical performance.

The conditional expression (12) defines a ratio between the total lens length at the telephoto end and a focal length of the entire system at the telephoto end (telephoto ratio). If the telephoto ratio becomes so large that the upper limit value in the conditional expression (12) is exceeded, it is difficult to downsize the zoom lens system. On the other hand, if the telephoto ratio becomes so small that the lower limit value in the conditional expression (12) is exceeded, refractive power of the first lens unit L1 or the second lens unit L2 becomes too large. As a result, fluctuations of various aberrations such as spherical aberration, chromatic aberration, and field curvature accompanying zooming become too large, which can hardly be corrected by other lens units.

The conditional expression (13) defines a ratio between the magnification ratio of the second lens unit L2 and the magnification ratio of the third lens unit L3. If the magnification ratio of the second lens unit L2 becomes so large that the upper limit value in the conditional expression (13) is exceeded, fluctuations of various aberrations such as lateral chromatic aberration and field curvature generated in the second lens unit L2 accompanying zooming become too large, which can hardly be corrected by other lens units. On the other hand, if the magnification ratio of the third lens unit L3 becomes so large that the lower limit value in the conditional expression (13) is exceeded, a fluctuation of the spherical aberration generated in the third lens unit L3 accompanying zooming becomes too large, which can hardly be corrected by other lens units. Note that, it is preferred to set the numerical value ranges of the conditional expressions (3) to (10), (12), and (13) as follows.

$$5.5 < f5/fw < 13.0 \tag{3a}$$

$$0.5 < m4/m3 < 1.3 \tag{4a}$$

$$-10.0 < f1/f2 < -5.0 \tag{5a}$$

$$1.2 < m1/m3 < 2.3 \tag{6a}$$

$$0.10 < |m1mid|/|m1| < 0.45 \tag{7a}$$

$$12 < (\beta 2t \times \beta 3t)/(\beta W2w \times \beta 3w) < 32 \tag{8a}$$

$$-2.6 < f2/fw < -1.7 \tag{9a}$$

$$1.1 < \beta 4t/4w < 2.5 \tag{10a}$$

$$0.75 < Lt/ft < 1.30 \tag{12a}$$

$$1.8 < (\beta 2t/\beta 2w)/(\beta 3t/\beta 3w) < 4.0 \tag{13a}$$

In addition, it is more preferred to set the numerical value ranges of the conditional expressions (3a) to (10a), (12a), and (13a) as follows to optimize the above-mentioned effect of each conditional expression.

$$6.0 < f5/fw < 12.0 \tag{3b}$$

$$0.6 < m4/m3 < 1.1 \tag{4b}$$

$$-9.0 < f1/f2 < -6.0 \tag{5b}$$

$$1.3 < m1/m3 < 2.0 \tag{6b}$$

$$0.15 < |m1mid|/|m1| < 0.35 \tag{7b}$$

$$15 < (\beta 2t \times \beta 3t)/(\beta 2w \times \beta 3w) < 27 \tag{8b}$$

$$-2.5 < f2/fw < -1.8 \tag{9b}$$

$$1.15 < \beta 4t/\beta 4w < 2.00 \tag{10b}$$

$$0.8 < Lt/ft < 1.2 \tag{12b}$$

$$2.0 < (\beta 2t/\beta 2w)/(\beta 3t/\beta 3w) < 3.2 \tag{13b}$$

According to each embodiment, with the structure described above, it is possible to obtain the zoom lens system having a small entire optical system, a wide angle of field, a high zoom ratio of approximately 30, and high optical performance over the entire zoom range.

In each embodiment, it is desirable that the aperture stop SP move along a locus different from that of the third lens unit L3 in zooming. The aperture stop SP is moved independently of the third lens unit L3 in zooming, and hence the entrance pupil position is shortened compared with the case where the aperture stop SP is disposed in a vicinity of the third lens unit L3 and is moved together with the third lens unit L3 as one unit. Therefore, an incident height of the off-axial light beam passing through the first lens unit L1 and the second lens unit L2 can be reduced, and hence an effective diameter and thickness of the lens constituting the lens unit can be reduced. In addition, in the case where the aperture stop SP is moved together with the third lens unit L3 as one unit, when trying to secure sufficient light amount in the screen periphery from the wide angle end to the second intermediate zoom position, peripheral light amount drops steeply in the screen periphery. On the other hand, when the aperture stop SP is moved from the wide angle end to the first intermediate zoom position independently of the third lens unit L3 by an appropriate amount, a stop diameter can be reduced because an axial light flux is diverging. By reducing the stop diameter and by disposing the aperture stop SP on the object side of the third lens unit L3, part of the off-axial light beam reaching a low image height in a peripheral angle of can be cut off, and hence the peripheral light amount can decrease mildly so that a decrease in the peripheral light amount is not conspicuous. In addition, when the aperture stop SP is moved toward the object side from the first intermediate zoom position to the telephoto end, and hence an effect of cutting off a flare component of the off-axial light flux can be obtained. Note that, the stop diameter of the aperture stop SP may be fixed or variable at each zoom position. When the stop diameter is fixed, control of the aperture stop SP becomes easy.

On the other hand, when the stop diameter of the aperture stop SP is variable so as to decrease from the first intermediate zoom position to the telephoto end, a flare component of the off-axial light beam can be cut off from the first intermediate zoom position to the telephoto end. Further, height of incident light passing through the front lens of the off-axial light flux is decreased, and hence the front lens effective diameter can be reduced. It is desirable to constitute the fourth lens unit L4 of one lens component. When the fourth lens unit L4 is constituted of one lens component, the total lens length can be decreased easily, and weight of the fourth lens unit L4 can be reduced, which is advantageous for driving in zooming. Here, one lens component applies not only the case where the lens unit is constituted of a single lens but also the case where the lens unit is constituted of a cemented lens in which one or more positive and negative lenses are cemented. When the cemented lens is used, in the case of realizing a wide angle of field of the zoom lens system, it is easy to correct lateral chromatic aberration appropriately at the wide angle end. It is desirable to constitute the fifth lens unit L5 of one lens component. The fifth lens unit L5 is moved for correcting image plane variation accompanying zooming and is moved for focusing. Therefore, a movement amount thereof is large, and drive frequency thereof is high. Therefore, it is preferred to constitute the fifth lens unit L5 of one lens component for reducing the weight so that a drive torque can be reduced. Next, a lens configuration of each embodiment is described.

First Embodiment

The first embodiment describes a five-unit zoom lens system including, in order from the object side to the image side, lens units having positive, negative, positive, negative, and positive refractive powers. The first lens unit L1 is constituted of a cemented lens in which the negative lens G11 having a meniscus shape with a convex surface on the object side and the positive lens G12 are cemented, and a positive lens G13 having a meniscus shape with a convex surface on the object side. The first lens unit L1 is constituted of three lenses, and hence a high zoom ratio is obtained while aberrations such as spherical aberration, longitudinal chromatic aberration, and lateral chromatic aberration can be corrected appropriately. The second lens unit L2 is constituted of three lenses including, in order from the object side to the image side, a negative lens having a meniscus shape with a convex surface toward the object side, a negative lens having a concave surface toward the image plane side, and a positive lens having a convex surface toward the object side, to thereby suppress aberration variation accompanying zooming. The third lens unit L3 is constituted of a positive lens having a convex surface toward the object side, a negative lens having a concave surface toward the image plane side, and a positive lens having a convex surface toward the image plane side. With this configuration of the third lens unit L3, object side principal point of the third lens unit L3 can be disposed in a vicinity of the lens surface closest to the object side in the third lens unit L3, which is advantageous for reducing the front lens diameter. Each of the fourth lens unit L4 and the fifth lens unit L5 is constituted of one lens component as described above. With the configuration described above, a half angle of field of $\omega=37.9$ degrees at the wide angle end and a zoom ratio of 26.8 are achieved. Note that, a whole or part of the third lens unit L3, or the fourth lens unit L4 may be moved to have a component in the direction perpendicular to the optical axis, so as to correct a blur in a shot image when the zoom lens system is shaken.

Second Embodiment

A zoom lens system according to the second embodiment is a five-unit zoom lens system similar to that of the first embodiment. The configuration of each lens unit in the zoom lens system according to the second embodiment is the same as that of the first embodiment. The fourth lens unit L4 is moved along a locus convex toward the object side in zooming from the wide angle end to the telephoto end, and hence a telephoto ratio is reduced. In the second embodiment, a half angle of field of $\omega=37.8$ degrees at the wide angle end and a zoom ratio of 26.8 are achieved.

Third Embodiment

A zoom lens system according to the third embodiment is a six-unit zoom lens system including, in order from the object side to the image side, lens units having positive, negative, positive, negative, positive, and negative refractive powers. The third embodiment facilitates aberration correction at higher level by adding one lens unit to the zoom lens system according to the first or second embodiment. The sixth lens unit L6 does not move for zooming and is disposed at a position close to the image plane. Because it is sufficient that the sixth lens unit L6 is disposed close to the front side of an imaging device, the zoom lens system according to the third embodiment can be implemented without complicating the lens barrel structure of the first or second embodiment so much. The lens surface on the object side of the lens constituting the sixth lens unit L6 has an aspherical shape, and hence field curvature can be corrected appropriately. The aspherical shape may be set to the lens surface on the image side so as to obtain a similar effect. In the third embodiment, a half angle of field of $\omega=37.8$ degrees at the wide angle end and a zoom ratio of 20 are achieved.

Fourth Embodiment

A zoom lens system according to the fourth embodiment is a five-unit zoom lens system similar to that of the first embodiment. The lens configuration of each lens unit is the same as that of the first embodiment. In the fourth embodiment, a half angle of field of ω=42.0 degrees at the wide angle end and a zoom ratio of 30 are achieved. In order to increase angle of field at the wide angle end, it is necessary to increase refractive power of the second lens unit L2, but accompanying it, large field curvature in an over direction occurs in the second lens unit L2 at the wide angle end. Therefore, the lens surface on the image plane side of the lens closest to the object side of the second lens unit L2 is set to an aspherical shape so that a curvature radius increases (power is weakened) locally in the lens periphery. Thus, the field curvature is corrected at the wide angle end so that flatness of the image plane is improved.

Fifth Embodiment

A zoom lens system according to the fifth embodiment is a six-unit zoom lens system including, in order from the object side to the image side, lens units having positive, negative, positive, negative, positive, and positive refractive powers. In the fifth embodiment, a half angle of field of ω=44.9 degrees at the wide angle end and a zoom ratio of 30 are achieved. The lens on the object side in the sixth lens unit L6 has a lens surface on the object side that is set to be an aspherical shape because of the same reason as in the third embodiment. When trying to achieve a wide angle of field at the wide angle end and a high zoom ratio simultaneously, an incident angle of a peripheral light flux passing through the second lens unit L2 and an incident height of the light beam are different largely between the wide angle end and the telephoto end. Therefore, much lateral chromatic aberration, field curvature, and the like occur in the lens unit. In addition, fluctuations of those aberrations accompanying zooming increase. Therefore, the second lens unit L2 is constituted of four lenses including a negative lens, a negative lens, a negative lens, and a positive lens, and hence the fluctuations of the aberrations accompanying zooming are suppressed to be small. In addition, one lens surface has an aspherical shape so that field curvature in the over direction, in particular at the wide angle end, is corrected appropriately.

Sixth Embodiment

A zoom lens system according to the sixth embodiment is a five-unit zoom lens system similar to that of the first embodiment. The lens configuration of each lens unit is the same as that of the first embodiment. In the sixth embodiment, in order to achieve a half angle of field of ω=45.7 degrees at the wide angle end and a zoom ratio of 30, the fourth lens unit L4 is a cemented lens constituted of a positive lens and a negative lens, and hence lateral chromatic aberration and field curvature fluctuation accompanying zooming can be corrected appropriately. In addition, the lens constituting the second lens unit L2 is made of glass material having high refractive index, so as to suppress an increase of Petzval sum in the negative direction accompanying an increase of refractive power of the second lens unit L2 when a wide angle of field and a high zoom ratio are achieved.

Seventh Embodiment

A zoom lens system according to the seventh embodiment is a five-unit zoom lens system similar to that of the first embodiment. In the seventh embodiment, in order to achieve a wider angle of field at the wide angle end, the second lens unit L2 is constituted of four lenses including an aspherical surface, and hence various aberrations such as lateral chromatic aberration and field curvature at the wide angle end are corrected appropriately. The configurations of other lens units are the same as those of the first embodiment. In the seventh embodiment, a half angle of field of ω=47.1 degrees at the wide angle end and a zoom ratio of 30 are achieved.

The exemplary embodiments of the present invention are described above, but the present invention is not limited to those embodiments, which can be modified and changed variously within a scope of spirit thereof.

Next, an embodiment of a digital still camera in which the zoom lens system according to the present invention is used as a photographing optical system is described with reference to FIG. 15. In FIG. 15, the digital still camera includes a camera main body 20 and a photographing optical system 21 constituted of any one of the zoom lens systems described above in the first to seventh embodiments. The digital still camera also includes a solid-state image pickup element (photoelectric transducer element) 22 such as a CCD sensor or a CMOS sensor incorporated in the camera main body for receiving an image of a subject formed by the photographing optical system 21. The digital still camera also includes a memory 23 for recording information corresponding to the image of a subject, on which photoelectric conversion has been performed by the solid-state image pickup element 22. The digital still camera also includes a finder 24 constituted of a liquid crystal display panel or the like for observing the image of a subject formed on the solid-state image pickup element 22. In this way, by using the zoom lens system according to the present invention for an image pickup apparatus such as a digital still camera or a video camera, it is possible to provide a small-sized image pickup apparatus having high optical performance. In each embodiment, negative distortion is generated largely at the wide angle end, and hence the imaging range of the solid-state image pickup element is set to a range smaller than that at other zoom positions. It is possible to correct distortion of the obtained image information electrically by a signal processing circuit for processing a signal from the solid-state image pickup element, so as to output an image with little distortion.

Next, Numerical Embodiments 1 to 7 corresponding respectively to the first to seventh embodiments of the present invention are described. In each Numerical Embodiment, i denotes an order of optical surfaces from the object side, ri denotes a curvature radius of the i-th optical surface (i-th surface), di denotes an interval between the i-th surface and the (i+1)th surface, ndi and vdi respectively denote a refractive index and an Abbe number of material of the i-th optical member with respect to the d-line. In addition, k denotes an eccentricity, A4, A6, and A8 denote aspherical coefficients, and a displacement in the optical axis direction at a position of height h from the optical axis with respect to a surface apex is denoted by x. Then, the aspherical shape is expressed by the following equation.

$$x = (h^2/R)/[1+[1-(1+k)(h/R)^2]^{1/2}] + A4h^4 + A6h^6 + A8h^8$$

where R denotes a paraxial curvature radius. In addition, the expression of "E-Z" means $10^{-z}$. The last two surfaces in the Numerical Embodiments are surfaces of the optical block such as a filter, a face plate, or the like. In each embodiment, a back focus (BF) indicates a distance between the lens end surface and the paraxial image plane in an equivalent length in air. The total lens length is a distance between the lens surface closest to the object side and the final lens surface plus the back focus. In addition, correspondence between each Numerical Embodiment and the above-mentioned conditional expression is shown in Table 1. The half angle of field is a value determined by light beam trace.

Numerical Embodiment 1
Unit: mm

Surface data

| Surface Number | r | d | nd | νd |
|---|---|---|---|---|
| 1 | 121.799 | 1.60 | 1.80610 | 33.3 |
| 2 | 49.556 | 4.62 | 1.49700 | 81.5 |
| 3 | −194.668 | 0.18 | | |
| 4 | 42.248 | 3.00 | 1.60311 | 60.6 |
| 5 | 133.383 | (Variable) | | |
| 6 | 84.974 | 1.00 | 1.88300 | 40.8 |
| 7 | 8.369 | 4.26 | | |
| 8 | −24.608 | 0.70 | 1.77250 | 49.6 |
| 9 | 58.741 | 0.22 | | |
| 10 | 18.926 | 2.07 | 1.94595 | 18.0 |
| 11 | 102.403 | (Variable) | | |
| 12 (Stop) | ∞ | (Variable) | | |
| 13* | 10.353 | 2.80 | 1.58313 | 59.4 |
| 14* | −109.462 | 2.90 | | |
| 15 | 23.498 | 0.70 | 1.84666 | 23.9 |
| 16 | 9.540 | 0.66 | | |
| 17 | 18.598 | 1.97 | 1.48749 | 70.2 |
| 18 | −25.104 | (Variable) | | |
| 19 | 782.644 | 0.70 | 1.48749 | 70.2 |
| 20 | 24.650 | (Variable) | | |
| 21 | 17.657 | 1.65 | 1.48749 | 70.2 |
| 22 | −1178.697 | (Variable) | | |
| 23 | ∞ | 0.80 | 1.51633 | 64.1 |
| 24 | ∞ | 0.50 | | |
| Image plane | ∞ | | | |

Aspherical surface data

Thirteenth surface $K = 5.51145e{-}001$  $A4 = -1.38948e{-}004$  $A6 = -8.42963e{-}007$
$A8 = -1.89369e{-}008$
Fourteenth surface $K = -1.00023e{+}001$  $A4 = 4.54336e{-}005$

Various data

| Zoom ratio | 26.79 | | | |
|---|---|---|---|---|
| Focal length | 5.15 | 8.68 | 26.98 | 137.95 |
| F-number | 2.87 | 3.56 | 4.75 | 5.76 |
| Half angle of field | 37.9 | 24.9 | 8.16 | 1.60 |
| Image height | 3.49 | 3.88 | 3.88 | 3.88 |
| Total lens length | 90.92 | 85.01 | 103.56 | 127.20 |
| BF | 10.18 | 12.52 | 20.94 | 10.73 |
| d5 | 0.78 | 6.37 | 31.22 | 57.27 |
| d11 | 31.79 | 22.02 | 10.64 | 2.46 |
| d12 | 10.87 | 4.78 | 1.08 | 0.80 |
| d18 | 2.59 | 4.26 | 6.26 | 8.71 |
| d20 | 5.68 | 6.01 | 4.38 | 18.20 |
| d22 | 9.15 | 11.50 | 19.92 | 9.70 |

Zoom lens unit data

| Unit | First surface | Focal length |
|---|---|---|
| 1 | 1 | 78.27 |
| 2 | 6 | −10.23 |
| 3 | 13 | 18.01 |
| 4 | 19 | −52.23 |
| 5 | 21 | 35.70 |

Numerical Embodiment 2

Surface data

| Surface Number | r | d | nd | νd |
|---|---|---|---|---|
| 1 | 80.182 | 1.30 | 1.80610 | 33.3 |
| 2 | 40.624 | 4.45 | 1.49700 | 81.5 |
| 3 | −170.485 | 0.15 | | |
| 4 | 34.906 | 3.03 | 1.48749 | 70.2 |
| 5 | 119.592 | (Variable) | | |
| 6 | 173.754 | 0.80 | 1.88300 | 40.8 |
| 7 | 8.185 | 4.05 | | |
| 8 | −27.621 | 0.65 | 1.71300 | 53.9 |
| 9 | 38.562 | 0.15 | | |
| 10 | 16.494 | 1.88 | 1.94595 | 18.0 |
| 11 | 60.078 | (Variable) | | |
| 12 (Stop) | ∞ | (Variable) | | |
| 13* | 9.219 | 2.84 | 1.58313 | 59.4 |
| 14* | −108.583 | 2.30 | | |
| 15 | 20.560 | 0.70 | 1.84666 | 23.9 |
| 16 | 8.647 | 0.81 | | |
| 17 | 25.715 | 1.83 | 1.48749 | 70.2 |
| 18 | −20.447 | (Variable) | | |
| 19 | −484.878 | 0.70 | 1.48749 | 70.2 |
| 20 | 21.397 | (Variable) | | |
| 21 | 15.939 | 1.60 | 1.48749 | 70.2 |
| 22 | 420.512 | (Variable) | | |
| 23 | ∞ | 0.80 | 1.51633 | 64.1 |
| 24 | ∞ | 0.50 | | |
| Image plane | ∞ | | | |

Aspherical surface data

Thirteenth surface $K = -2.92836e{-}001$  $A4 = -6.68119e{-}005$  $A6 = -44.0175e{-}009$
$A8 = -2.63210e{-}009$
Fourteenth surface $K = -1.00023e{+}001$  $A4 = 5.42174e{-}005$

Various data

| Zoom ratio | 26.79 | | | |
|---|---|---|---|---|
| Focal length | 5.15 | 8.75 | 26.81 | 137.95 |
| F-number | 2.87 | 3.34 | 3.87 | 5.36 |
| Half angle of field | 37.8 | 24.7 | 8.17 | 1.59 |
| Image height | 3.49 | 3.88 | 3.88 | 3.88 |
| Total lens length | 86.60 | 80.76 | 97.88 | 111.23 |
| BF | 10.00 | 13.85 | 23.54 | 10.17 |
| d5 | 0.70 | 5.22 | 27.37 | 47.09 |
| d11 | 31.03 | 18.99 | 4.99 | 1.71 |
| d12 | 10.04 | 7.04 | 8.20 | 1.31 |
| d18 | 4.14 | 4.11 | 1.74 | 7.15 |
| d20 | 3.44 | 4.33 | 4.81 | 16.58 |
| d22 | 8.97 | 12.82 | 22.51 | 9.14 |

Zoom lens unit data

| Unit | First surface | Focal length |
|---|---|---|
| 1 | 1 | 65.50 |
| 2 | 6 | −9.49 |
| 3 | 13 | 17.37 |
| 4 | 19 | −42.02 |
| 5 | 21 | 33.94 |

Numerical Embodiment 3

Surface data

| Surface Number | r | d | nd | vd |
|---|---|---|---|---|
| 1 | 78.086 | 1.60 | 1.90366 | 31.3 |
| 2 | 39.847 | 3.67 | 1.59282 | 68.6 |
| 3 | 418.743 | 0.18 | | |
| 4 | 45.410 | 2.94 | 1.60311 | 60.6 |
| 5 | 366.835 | (Variable) | | |
| 6 | 86.051 | 1.00 | 1.88300 | 40.8 |
| 7 | 8.932 | 4.86 | | |
| 8 | −23.483 | 0.70 | 1.71300 | 53.9 |
| 9 | 79.273 | 0.16 | | |
| 10 | 20.553 | 2.14 | 1.94595 | 18.0 |
| 11 | 91.399 | (Variable) | | |
| 12 (Stop) | ∞ | (Variable) | | |
| 13* | 9.821 | 2.95 | 1.58313 | 59.4 |
| 14* | −100.820 | 2.81 | | |
| 15 | 21.920 | 0.70 | 1.84666 | 23.9 |
| 16 | 8.977 | 0.65 | | |
| 17 | 18.440 | 2.03 | 1.48749 | 70.2 |
| 18 | −21.144 | (Variable) | | |
| 19 | −213.307 | 0.70 | 1.48749 | 70.2 |
| 20 | 21.591 | (Variable) | | |
| 21 | 15.322 | 1.65 | 1.48749 | 70.2 |
| 22 | 137.623 | (Variable) | | |
| 23* | −362.086 | 0.80 | 1.55332 | 71.7 |
| 24 | 132.929 | 1.00 | | |
| 25 | ∞ | 0.80 | 1.51633 | 64.1 |
| 26 | ∞ | 0.50 | | |
| Image plane | ∞ | | | |

Aspherical surface data

Thirteenth surface

K = 5.27858e−001  A4 = −1.60043e−004  A6 = −1.04638e−006
A8 = −2.61534e−008
Fourteenth surface K = −1.00023e+001  A4 = 5.73948e−005
Twenty-third surface K = −2.64122e+005  A4 = −9.88034e−005  A6 = 3.99352e−006

Various data

| Zoom ratio | 20.00 | | | |
|---|---|---|---|---|
| Focal length | 5.15 | 8.79 | 23.03 | 103.00 |
| F-number | 2.87 | 3.38 | 3.85 | 5.35 |
| Half angle of field | 37.8 | 24.7 | 9.53 | 2.14 |
| Image height | 3.49 | 3.88 | 3.88 | 3.88 |
| Total lens length | 90.30 | 83.46 | 95.23 | 113.13 |
| BF | 2.03 | 2.03 | 2.03 | 2.03 |
| d5 | 0.78 | 6.11 | 25.69 | 48.39 |
| d11 | 34.34 | 21.31 | 7.83 | 1.87 |
| d12 | 10.03 | 6.37 | 5.76 | 1.40 |
| d18 | 2.00 | 1.79 | 2.68 | 7.04 |
| d20 | 4.20 | 6.10 | 5.91 | 14.77 |
| d22 | 7.38 | 10.22 | 15.80 | 8.09 |

Zoom lens unit data

| Unit | First surface | Focal length |
|---|---|---|
| 1 | 1 | 71.83 |
| 2 | 6 | −10.88 |
| 3 | 13 | 16.85 |
| 4 | 19 | −40.18 |
| 5 | 21 | 35.21 |
| 6 | 23 | −175.62 |

Numerical Embodiment 4

Surface data

| Surface Number | r | d | nd | vd |
|---|---|---|---|---|
| 1 | 122.347 | 1.60 | 1.80610 | 33.3 |
| 2 | 49.639 | 4.89 | 1.49700 | 81.5 |
| 3 | −177.205 | 0.18 | | |
| 4 | 42.896 | 3.00 | 1.60311 | 60.6 |
| 5 | 138.111 | (Variable) | | |
| 6 | 93.418 | 1.00 | 1.84862 | 40.0 |
| 7* | 7.704 | 5.02 | | |
| 8 | −30.312 | 0.70 | 1.77250 | 49.6 |
| 9 | 36.110 | 0.30 | | |
| 10 | 18.112 | 2.00 | 1.94595 | 18.0 |
| 11 | 95.392 | (Variable) | | |
| 12 (Stop) | ∞ | (Variable) | | |
| 13* | 10.384 | 2.91 | 1.58313 | 59.4 |
| 14* | −93.636 | 3.16 | | |
| 15 | 29.195 | 0.70 | 1.84666 | 23.9 |
| 16 | 9.894 | 0.45 | | |
| 17 | 17.618 | 1.81 | 1.48749 | 70.2 |
| 18 | −19.844 | (Variable) | | |
| 19 | 367.114 | 0.70 | 1.48749 | 70.2 |
| 20 | 22.067 | (Variable) | | |
| 21 | 17.549 | 1.65 | 1.48749 | 70.2 |
| 22 | −2151.908 | (Variable) | | |
| 23 | ∞ | 0.80 | 1.51633 | 64.1 |
| 24 | ∞ | (Variable) | | |
| Image plane | ∞ | | | |

Aspherical surface data

Seventh surface

K = −7.87705e−002  A4 = −2.08842e−005  A6 = −6.77575e−008
A8 = 5.93737e−009  A10 = −3.42438e−010
Thirteenth surface K = 6.61411e−001  A4 = −1.47276e−004  A6 = −9.84917e−007
A8 = −2.08424e−008
Fourteenth surface K = −1.00023e+001  A4 = 6.40118e−005

Various data

| Zoom ratio | 29.89 | | | |
|---|---|---|---|---|
| Focal length | 4.42 | 7.59 | 23.90 | 132.00 |
| F-number | 2.87 | 3.42 | 4.30 | 5.76 |
| Half angle of field | 42.0 | 27.7 | 9.11 | 1.67 |
| Image height | 3.49 | 3.88 | 3.88 | 3.88 |
| Total lens length | 91.50 | 85.29 | 102.05 | 127.23 |
| BF | 10.12 | 11.63 | 19.58 | 10.66 |
| d5 | 0.78 | 6.57 | 30.23 | 56.61 |
| d11 | 33.41 | 22.40 | 8.31 | 1.73 |
| d12 | 10.41 | 5.12 | 3.39 | 1.35 |
| d18 | 2.00 | 3.67 | 5.89 | 9.81 |
| d20 | 4.72 | 5.84 | 4.59 | 17.00 |
| d22 | 9.09 | 10.60 | 18.55 | 9.64 |

Zoom lens unit data

| Unit | First surface | Focal length |
|---|---|---|
| 1 | 1 | 77.27 |
| 2 | 6 | −9.53 |
| 3 | 13 | 17.28 |
| 4 | 19 | −48.19 |
| 5 | 21 | 35.72 |

Numerical Embodiment 5

Surface data

| Surface Number | r | d | nd | vd |
|---|---|---|---|---|
| 1 | 85.200 | 1.60 | 1.80000 | 29.8 |
| 2 | 41.164 | 6.05 | 1.49700 | 81.5 |
| 3 | 1981.992 | 0.18 | | |
| 4 | 42.972 | 3.38 | 1.71300 | 53.9 |
| 5 | 163.523 | (Variable) | | |
| 6 | 120.140 | 1.00 | 1.80400 | 46.6 |
| 7 | 8.988 | 3.38 | | |
| 8 | 21.988 | 0.80 | 1.85960 | 40.4 |
| 9* | 11.179 | 2.96 | | |
| 10 | −121.625 | 0.70 | 1.81600 | 46.6 |
| 11 | 30.103 | 0.30 | | |
| 12 | 16.537 | 2.12 | 1.92286 | 18.9 |
| 13 | 73.840 | (Variable) | | |
| 14 (Stop) | ∞ | (Variable) | | |
| 15* | 7.856 | 2.62 | 1.58313 | 59.4 |
| 16* | 21.340 | 3.07 | | |
| 17 | 17.051 | 0.70 | 1.80518 | 25.4 |
| 18 | 8.004 | 0.32 | | |
| 19 | 9.507 | 2.79 | 1.48749 | 70.2 |
| 20 | −9.954 | (Variable) | | |
| 21 | −7.647 | 0.70 | 1.77250 | 49.6 |
| 22 | −16.822 | (Variable) | | |
| 23 | 28.147 | 1.70 | 1.48749 | 70.2 |
| 24 | −96.067 | (Variable) | | |
| 25* | 68.321 | 1.00 | 1.55332 | 71.7 |
| 26 | 153.178 | 1.00 | | |
| 27 | ∞ | 0.80 | 1.51633 | 64.1 |
| 28 | ∞ | 0.50 | | |
| Image plane | ∞ | | | |

Aspherical surface data

Ninth surface

K = −8.45926e−001   A4 = 3.70989e−005   A6 = −1.14391e−007

Fifteenth surface

K = 7.23287e−002   A4 = −1.12090e−004   A6 = −1.00884e−006
A8 = −3.88181e−008

Sixteenth surface

K = −1.00023e+001   A4 = 2.35114e−004

Twenty-fifth surface

K = −4.82923e+001   A4 = −1.50317e−004   A6 = 2.85996e−006

Various data

| Zoom ratio | 29.86 | | | |
|---|---|---|---|---|
| Focal length | 3.95 | 7.34 | 21.44 | 117.99 |
| F-number | 2.77 | 3.34 | 4.34 | 5.76 |
| Half angle of field | 44.9 | 28.2 | 10.1 | 1.86 |
| Image height | 3.49 | 3.88 | 3.88 | 3.88 |
| Total lens length | 91.75 | 85.38 | 101.15 | 126.62 |
| BF | 2.03 | 2.03 | 2.03 | 2.03 |
| d5 | 0.78 | 6.46 | 25.81 | 50.32 |
| d13 | 30.98 | 16.87 | 5.76 | 1.57 |
| d14 | 11.13 | 8.04 | 5.60 | 1.32 |
| d20 | 1.90 | 1.91 | 1.93 | 1.96 |
| d22 | 2.69 | 5.91 | 8.63 | 24.05 |
| d24 | 6.88 | 8.79 | 16.03 | 10.00 |

Zoom lens unit data

| Unit | First surface | Focal length |
|---|---|---|
| 1 | 1 | 71.32 |
| 2 | 6 | −8.80 |
| 3 | 15 | 12.65 |
| 4 | 21 | −18.77 |
| 5 | 23 | 44.86 |
| 6 | 25 | 221.96 |

Numerical Embodiment 6

Surface data

| Surface Number | r | d | nd | vd |
|---|---|---|---|---|
| 1 | 79.548 | 1.40 | 2.00069 | 25.5 |
| 2 | 48.163 | 4.93 | 1.49700 | 81.5 |
| 3 | 46140.146 | 0.15 | | |
| 4 | 47.433 | 3.21 | 1.77250 | 49.6 |
| 5 | 153.622 | (Variable) | | |
| 6 | 180.621 | 1.10 | 1.88300 | 40.8 |
| 7 | 9.363 | 4.17 | | |
| 8 | 77.921 | 1.00 | 1.85960 | 40.4 |
| 9* | 10.888 | 2.59 | | |
| 10 | 18.975 | 2.23 | 1.94595 | 18.0 |
| 11 | 105.900 | (Variable) | | |
| 12 (Stop) | ∞ | (Variable) | | |
| 13* | 7.739 | 2.90 | 1.58313 | 59.4 |
| 14* | 19.349 | 3.62 | | |
| 15 | 16.658 | 0.70 | 1.80518 | 25.4 |
| 16 | 7.512 | 0.22 | | |
| 17 | 8.191 | 2.59 | 1.48749 | 70.2 |
| 18 | −9.227 | (Variable) | | |
| 19 | −7.147 | 0.55 | 1.77250 | 49.6 |
| 20 | −22.848 | 1.00 | 1.48749 | 70.2 |
| 21 | −16.607 | (Variable) | | |
| 22 | 29.150 | 1.70 | 1.48749 | 70.2 |
| 23 | −37.230 | (Variable) | | |
| 24 | ∞ | 0.80 | 1.51633 | 64.1 |
| 25 | ∞ | 0.80 | | |
| Image plane | ∞ | | | |

Aspherical surface data

Ninth surface

K = −8.88155e−001   A4 = −5.86626e−005   A6 = −2.32149e−007
A8 = −3.41828e−009

Thirteenth surface

K = −2.16367e−001   A4 = −6.54315e−006   A6 = 2.96112e−007
A8 = −2.57814e−008

Fourteenth surface

K = −1.00023e+001   A4 = 3.61034e−004

Various data

| Zoom ratio | 29.87 | | | |
|---|---|---|---|---|
| Focal length | 3.85 | 7.40 | 21.13 | 114.99 |
| F-number | 2.87 | 3.78 | 4.65 | 5.76 |
| Half angle of field | 45.7 | 28.4 | 10.3 | 1.93 |
| Image height | 3.49 | 3.88 | 3.88 | 3.88 |
| Total lens length | 90.07 | 80.37 | 101.14 | 126.73 |
| BF | 9.13 | 10.88 | 16.70 | 9.94 |
| d5 | 0.78 | 4.47 | 26.76 | 53.64 |
| d11 | 37.08 | 21.57 | 7.65 | 1.59 |
| d12 | 5.42 | 1.25 | 2.59 | 1.34 |
| d18 | 1.95 | 2.03 | 2.03 | 2.06 |

-continued

Numerical Embodiment 6

| d21 | 1.63 | 6.10 | 11.34 | 24.09 |
|---|---|---|---|---|
| d23 | 7.81 | 9.55 | 15.37 | 8.61 |

Zoom lens unit data

| Unit | First surface | Focal length |
|---|---|---|
| 1 | 1 | 74.39 |
| 2 | 6 | −9.18 |
| 3 | 13 | 12.39 |
| 4 | 19 | −15.88 |
| 5 | 22 | 33.82 |

Numerical Embodiment 7

Surface data

| Surface Number | r | d | nd | νd |
|---|---|---|---|---|
| 1 | 88.341 | 1.40 | 2.00069 | 25.5 |
| 2 | 51.711 | 4.76 | 1.49700 | 81.5 |
| 3 | −533.545 | 0.15 | | |
| 4 | 47.021 | 3.21 | 1.77250 | 49.6 |
| 5 | 134.387 | (Variable) | | |
| 6 | 222.276 | 1.00 | 1.88300 | 40.8 |
| 7 | 9.418 | 3.74 | | |
| 8 | 33.065 | 1.00 | 1.85960 | 40.4 |
| 9* | 9.308 | 1.94 | | |
| 10 | 24.992 | 1.00 | 1.48749 | 70.2 |
| 11 | 18.144 | 0.84 | | |
| 12 | 16.663 | 2.28 | 1.92286 | 18.9 |
| 13 | 75.945 | (Variable) | | |
| 14 (Stop) | ∞ | (Variable) | | |
| 15* | 7.809 | 2.51 | 1.55332 | 71.7 |
| 16* | 33.977 | 3.17 | | |
| 17 | 15.741 | 0.70 | 1.80518 | 25.4 |
| 18 | 8.129 | 0.42 | | |
| 19 | 11.872 | 2.28 | 1.48749 | 70.2 |
| 20 | −10.484 | (Variable) | | |
| 21 | −7.560 | 0.55 | 1.80400 | 46.6 |
| 22 | 78.309 | 1.25 | 1.48749 | 70.2 |
| 23 | −11.119 | (Variable) | | |
| 24 | 27.138 | 1.70 | 1.48749 | 70.2 |
| 25 | −33.257 | (Variable) | | |
| 26 | ∞ | 0.80 | 1.51633 | 64.1 |
| 27 | ∞ | 1.00 | | |
| Image plane | ∞ | | | |

Aspherical surface data

Ninth surface

K = −2.37707e+000  A4 = 1.61662e−004  A6 = −1.57508e−006

Fifteenth surface

K = −3.51719e−001  A4 = −9.49961e−006  A6 = −4.43262e−007
A8 = 5.01439e−009

Sixteenth surface

K = −1.00023e+001  A4 = 1.75529e−004

Various data

| Zoom ratio | 29.56 | | | |
|---|---|---|---|---|
| Focal length | 3.65 | 7.07 | 19.95 | 108.00 |
| F-number | 2.87 | 3.70 | 4.56 | 5.76 |
| Half angle of field | 47.1 | 28.7 | 10.9 | 1.96 |
| Image height | 3.49 | 3.88 | 3.88 | 3.70 |
| Total lens length | 89.74 | 83.62 | 99.91 | 127.25 |
| BF | 8.51 | 9.88 | 16.60 | 9.33 |
| d5 | 0.70 | 7.53 | 27.32 | 54.61 |
| d13 | 34.88 | 21.32 | 7.34 | 1.60 |
| d14 | 7.78 | 2.89 | 2.71 | 2.38 |
| d20 | 2.61 | 2.72 | 2.72 | 2.79 |
| d23 | 1.36 | 5.38 | 9.31 | 22.64 |
| d25 | 6.98 | 8.35 | 15.08 | 7.81 |

Zoom lens unit data

| Unit | First surface | Focal length |
|---|---|---|
| 1 | 1 | 75.11 |
| 2 | 6 | −8.94 |
| 3 | 15 | 12.48 |
| 4 | 21 | −16.34 |
| 5 | 24 | 30.94 |

TABLE 1

| Conditional expression | Numerical Embodiment | | | | | | |
|---|---|---|---|---|---|---|---|
| | 1 | 2 | 3 | 4 | 5 | 6 | 7 |
| (1) | 15.20 | 12.72 | 13.95 | 17.50 | 18.05 | 19.32 | 20.56 |
| (2) | 0.567 | 0.475 | 0.697 | 0.585 | 0.604 | 0.647 | 0.695 |
| (3) | 6.93 | 6.59 | 6.84 | 8.09 | 11.35 | 8.78 | 8.47 |
| (4) | 0.681 | 0.816 | 0.691 | 0.622 | 0.998 | 0.995 | 0.992 |
| (5) | −7.65 | −6.90 | −6.60 | −8.11 | −8.10 | −8.10 | −8.40 |
| (6) | 1.89 | 1.51 | 1.40 | 1.73 | 1.42 | 1.57 | 1.68 |
| (7) | 0.163 | 0.237 | 0.300 | 0.174 | 0.182 | 0.265 | 0.163 |
| (8) | 23.1 | 22.2 | 17.1 | 25.6 | 18.7 | 17.9 | 18.2 |
| (9) | −1.99 | −1.84 | −2.11 | −2.16 | −2.23 | −2.39 | −2.45 |
| (10) | 1.18 | 1.22 | 1.21 | 1.19 | 1.75 | 1.72 | 1.69 |
| (11) Left side | 0.511 | 0.511 | 0.531 | 0.511 | 0.511 | 0.511 | 0.511 |
| (11) Right side | 0.539 | 0.539 | 0.544 | 0.539 | 0.539 | 0.539 | 0.539 |
| (12) | 0.922 | 0.806 | 1.098 | 0.964 | 1.073 | 1.102 | 1.178 |
| (13) | 2.57 | 2.09 | 2.63 | 3.00 | 2.37 | 2.17 | 2.19 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-232227, filed Oct. 6, 2009, which is hereby incorporated by reference herein in its entirety.

What is claimed is:

1. A zoom lens system comprising, in an order from an object side to an image side:
a first lens unit having positive refractive power;
a second lens unit having negative refractive power;
a third lens unit having positive refractive power;
a fourth lens unit having negative refractive power; and
a fifth lens unit having positive refractive power,
wherein in zooming from a wide angle end to a telephoto end, the first lens unit, the second lens unit, the third lens unit, and the fourth lens unit move so that an interval between the first lens unit and the second lens unit is larger at the telephoto end than that at the wide angle end, an interval between the second lens unit and the third lens unit is smaller at the telephoto end than that at the wide angle end, and an interval between the third lens unit and the fourth lens unit varies,
wherein the first lens unit moves along a locus convex toward an image plane in zooming, and
wherein the following conditional expressions are satisfied:

$$8.0 < f1/fw < 25.0;$$

$$0.35 < f1/ft < 0.70; \text{ and}$$

$$0.05 < |m1\text{mid}/m1| < 0.60,$$

where f1 denotes a focal length of the first lens unit, fw and ft denote focal lengths of an entire system at the wide angle end and at the telephoto end, respectively, m1 denotes a movement amount of the first lens unit accompanying the zooming from the wide angle end to the telephoto end, and m1 mid denotes a movement amount of the first lens unit from the wide angle end to a zoom position where the first lens unit is positioned closest to the image plane.

2. A zoom lens system according to claim 1, wherein the following conditional expression is satisfied:

$$5.0 < f5/fw < 15.0,$$

where f5 denotes a focal length of the fifth lens unit.

3. A zoom lens system according to claim 1, wherein the following conditional expression is satisfied:

$$0.4 < m4/m3 < 1.5,$$

where m3 and m4 denote movement amounts of the third lens unit and the fourth lens unit accompanying the zooming from the wide angle end to the telephoto end, respectively.

4. A zoom lens system according to claim 1, wherein the following conditional expression is satisfied:

$$-12.0 < f1/f2 > -4.0,$$

where f2 denotes a focal length of the second lens unit.

5. A zoom lens system according to claim 1, wherein the following conditional expression is satisfied:

$$1.0 < m1/m3 < 2.7,$$

where m3 denotes movement amounts of the third lens unit accompanying zooming from the wide angle end to the telephoto end.

6. A zoom lens system according to claim 1, further comprising:
an aperture stop disposed between the second lens unit and the third lens unit,
wherein the aperture stop moves along a locus different from a locus of the third lens unit in zooming.

7. A zoom lens system according to claim 1, wherein the following conditional expression is satisfied:

$$10 < (\beta 2t \times \beta 3t)/(\beta 2w \times \beta 3w) < 40,$$

where $\beta 2w$ and $\beta 2t$ denote lateral magnifications of the second lens unit at the wide angle end and at the telephoto end, respectively, and $\beta 3w$ and $\beta 3t$ denote lateral magnifications of the third lens unit at the wide angle end and at the telephoto end, respectively.

8. A zoom lens system according to claim 1, wherein the following conditional expression is satisfied:

$$-2.8 < f2/fw < -1.5,$$

where f2 denotes a focal length of the second lens unit.

9. A zoom lens system according to claim 1, wherein the following conditional expression is satisfied:

$$1.0 < \beta 4t/\beta 4w < 3.0,$$

where $\beta 4w$ and $\beta 4t$ denote lateral magnifications of the fourth lens unit at the wide angle end and at the telephoto end, respectively.

10. A zoom lens system according to claim 1, wherein:
the first lens unit comprises a cemented lens in which a positive lens and a negative lens are cemented, and
the following conditional expression is satisfied:

$$-0.0016 v d1p + 0.641 < \theta gF1p,$$

where vd1p and $\theta$gF1p denote an Abbe number and a partial dispersion ratio of a material of the positive lens constituting the cemented lens, respectively.

11. A zoom lens system according to claim 1, wherein the following conditional expression is satisfied:

$$0.7 < Lt/ft < 1.4,$$

where Lt denotes a distance between a lens surface positioned closest to the object side in the first lens unit and an image plane at the telephoto end.

12. A zoom lens system according to claim 1, wherein the following conditional expression is satisfied:

$$1.5 < (\beta 2t/\beta 2w)/(\beta 3t/\beta 3w) < 5.0,$$

where β2w and β2t denote lateral magnifications of the second lens unit at the wide angle end and at the telephoto end, respectively, and $\beta 3w$ and $\beta 3t$ denote lateral magnifications of the third lens unit at the wide angle end and at the telephoto end, respectively.

13. A zoom lens system according to claim 1, wherein the fourth lens unit consists of one lens component.

14. A zoom lens system according to claim 1, wherein the fifth lens unit consists of one lens component.

15. A zoom lens system according to claim 1, further comprising a sixth lens unit having positive or negative refractive power disposed on the image side of the fifth lens unit.

16. A zoom lens system according to claim 1, which forms an image on a solid-state image pickup element.

17. An image pickup apparatus, comprising:
a zoom lens system; and
a solid-state image pickup element which receives an image of light formed by the zoom lens system, wherein the zoom lens system comprises, in an order from an object side to an image side:

a first lens unit having positive refractive power;
a second lens unit having negative refractive power;
a third lens unit having positive refractive power;
a fourth lens unit having negative refractive power; and
a fifth lens unit having positive refractive power,
wherein in zooming from a wide angle end to a telephoto end, the first lens unit, the second lens unit, the third lens unit, and the fourth lens unit move so that an interval between the first lens unit and the second lens unit is larger at the telephoto end than that at the wide angle end, an interval between the second lens unit and the third lens unit is smaller at the telephoto end than that at the wide angle end, and an interval between the third lens unit and the fourth lens unit varies,
wherein the first lens unit moves along a locus convex toward an image plane in zooming, and
wherein the following conditional expressions are satisfied:

$8.0 < f1/fw < 25.0$;

$0.35 < f1/ft < 0.70$; and $0.05 < |m1\text{mid}|/|m1| < 0.60$, where f1 denotes a focal length of the first lens unit, fw and ft denote focal lengths of an entire system at the wide angle end and at the telephoto end, respectively, m1 denotes a movement amount of the first lens unit accompanying the zooming from the wide angle end to the telephoto end, and m1 mid denotes a movement amount of the first lens unit from the wide angle end to a zoom position where the first lens unit is positioned closest to the image plane.

18. A zoom lens system comprising, in an order from an object side to an image side:

a first lens unit having positive refractive power;
a second lens unit having negative refractive power;
a third lens unit having positive refractive power;
a fourth lens unit having negative refractive power;
a fifth lens unit having positive refractive power; and
a sixth lens unit having positive or negative refractive power,
wherein in zooming from a wide angle end to a telephoto end, the first lens unit, the second lens unit, the third lens unit, and the fourth lens unit move so that an interval between the first lens unit and the second lens unit is larger at the telephoto end than that at the wide angle end, an interval between the second lens unit and the third lens unit is smaller at the telephoto end than that at the wide angle end, and an interval between the third lens unit and the fourth lens unit varies, and
wherein the following conditional expressions are satisfied:

$8.0 < f1/fw < 25.0$; and $0.35 < f1/ft < 0.70$, where f1 denotes a focal length of the first lens unit, and fw and ft denote focal lengths of an entire system at the wide angle end and at the telephoto end, respectively.

19. An image pickup apparatus comprising:
a zoom lens system; and
a solid-state image pickup element which receives an image of light formed by the zoom lens system,
wherein the zoom lens system comprises, in an order from an object side to an image side:
a first lens unit having positive refractive power;
a second lens unit having negative refractive power;
a third lens unit having positive refractive power;
a fourth lens unit having negative refractive power;
a fifth lens unit having positive refractive power; and
a sixth lens unit having positive or negative refractive power, wherein in zooming from a wide angle end to a telephoto end, the first lens unit, the second lens unit, the third lens unit, and the fourth lens unit move so that an interval between the first lens unit and the second lens unit is larger at the telephoto end than that at the wide angle end, an interval between the second lens unit and the third lens unit is smaller at the telephoto end than that at the wide angle end, and an interval between the third lens unit and the fourth lens unit varies, and
wherein the following conditional expressions are satisfied:

$8.0 < f1/fw < 25.0$; and $0.35 < f1/ft < 0.70$, where f1 denotes a focal length of the first lens unit, and fw and ft denote focal lengths of an entire system at the wide angle end and at the telephoto end, respectively.

* * * * *